United States Patent
Ido et al.

(10) Patent No.: US 9,888,451 B2
(45) Date of Patent: Feb. 6, 2018

(54) METHOD OF DYNAMICALLY ASSOCIATING AN ACCESSORY ID WITH A PORTABLE MEMORY DEVICE AND DISPLAYING CONFIRMATION OF THE ASSOCIATION

(71) Applicant: Toshiba Memory Corporation, Tokyo (JP)

(72) Inventors: Michio Ido, Yokohama Kanagawa (JP); Keisuke Sato, Yokohama Kanagawa (JP); Shigeto Endo, Kamakura Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 0 days.

(21) Appl. No.: 15/246,902

(22) Filed: Aug. 25, 2016

(65) Prior Publication Data

US 2017/0099646 A1 Apr. 6, 2017

(30) Foreign Application Priority Data

Oct. 5, 2015 (JP) .................. 2015-197695

(51) Int. Cl.
*H04B 5/00* (2006.01)
*H04W 60/04* (2009.01)
(Continued)

(52) U.S. Cl.
CPC ........ *H04W 60/04* (2013.01); *G06K 9/00577* (2013.01); *H04W 4/008* (2013.01); *H04M 1/7253* (2013.01); *H04M 2250/04* (2013.01)

(58) Field of Classification Search
CPC ........... G06K 9/00577; G06K 19/0723; G06K 7/0008; H04W 60/04; H04W 4/008;
(Continued)

(56) References Cited

U.S. PATENT DOCUMENTS 8,743,145 B1 6/2014 Price
2013/0346168 A1 12/2013 Zhou et al.
(Continued)

FOREIGN PATENT DOCUMENTS

JP H04323980 A 11/1992
JP 4339020 B2 10/2009
(Continued)

*Primary Examiner* — Nhan Le
(74) *Attorney, Agent, or Firm* — Patterson & Sheridan, LLP

(57) ABSTRACT

A method of dynamically associating an accessory ID with a portable memory device and displaying confirmation of the association includes: when an accessory and a first portable memory device are coupled with a host apparatus, detecting the accessory ID of the accessory and storing the accessory ID in the first portable memory device; wirelessly transmitting the accessory ID and a device ID of the first portable memory device for registration in association with one another; and subsequent to the registration, upon determining that a code captured from a portable memory devices uniquely corresponds to that of the first portable memory device, retrieving an image corresponding to the accessory ID that is registered in association with the device ID of the first portable memory device, and displaying the image on a display device for visual confirmation that the portable memory device contains the data generated in connection with the accessory ID.

19 Claims, 25 Drawing Sheets

(51) Int. Cl.
*G06K 9/00* (2006.01)
*H04W 4/00* (2009.01)
*H04M 1/725* (2006.01)

(58) Field of Classification Search
CPC ..... H04W 84/18; H04W 88/06; H04W 76/02; H04M 1/7253; H04M 2250/04; H04B 5/02; H04B 5/0012; H04B 5/00
USPC .. 455/41.1, 41.2, 410, 414.1, 415, 418–420, 455/556.1, 556.2, 557, 558
See application file for complete search history.

(56) References Cited

U.S. PATENT DOCUMENTS

| | | | |
|---|---|---|---|
| 2014/0173082 A1* | 6/2014 | Shin | H04L 41/24 709/223 |
| 2015/0199169 A1* | 7/2015 | Manley | G06F 3/162 710/106 |

FOREIGN PATENT DOCUMENTS

| | | |
|---|---|---|
| JP | 4986264 B2 | 7/2012 |
| JP | 2015060479 A | 3/2015 |

* cited by examiner

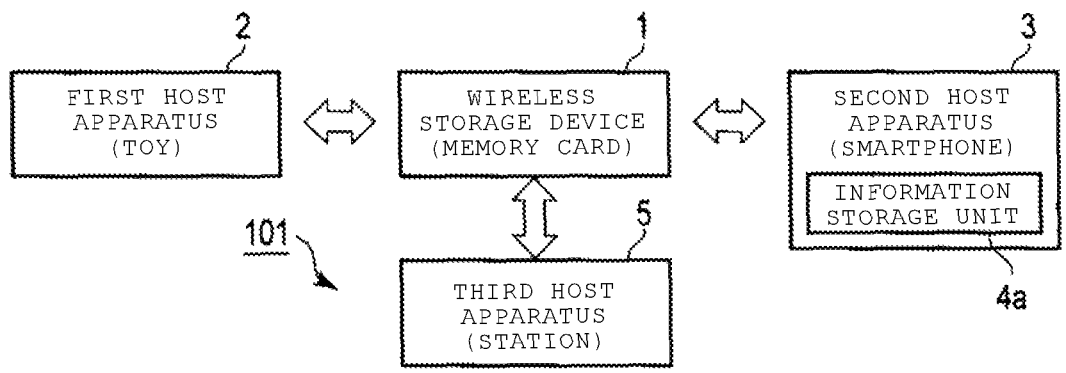
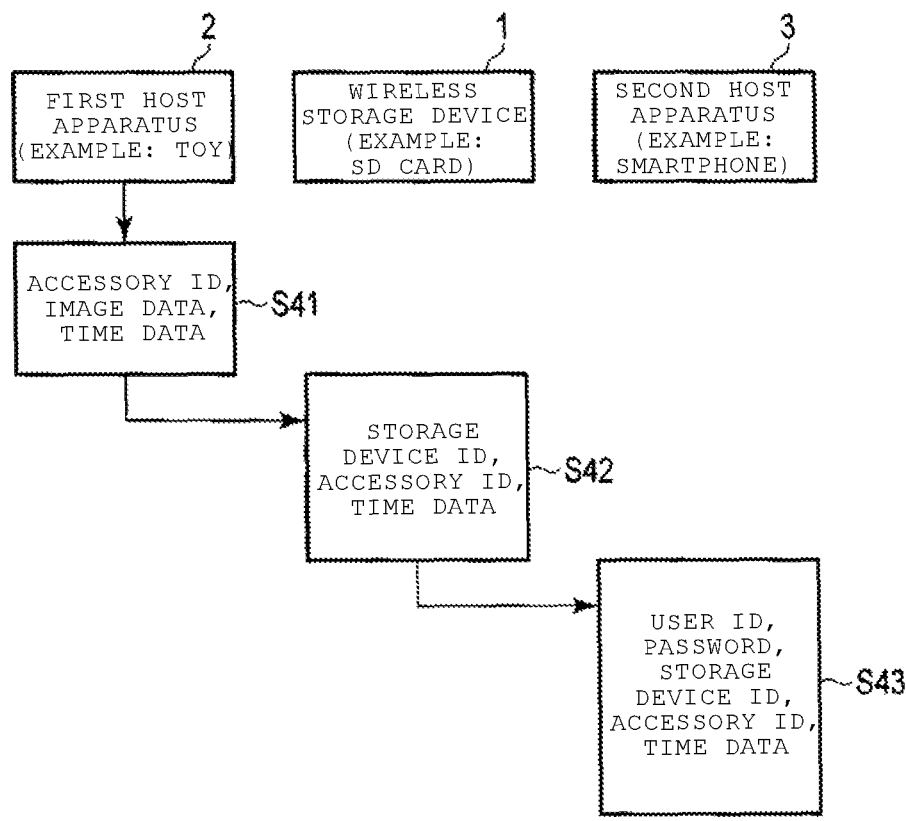

METHOD OF DYNAMICALLY ASSOCIATING AN ACCESSORY ID WITH A PORTABLE MEMORY DEVICE AND DISPLAYING CONFIRMATION OF THE ASSOCIATION

CROSS-REFERENCE TO RELATED APPLICATION

This application is based upon and claims the benefit of priority from Japanese Patent Application No. 2015-197695, filed Oct. 5, 2015, the entire contents of which are incorporated herein by reference.

FIELD

Embodiments described herein relate generally to a method of dynamically associating an accessory ID with a portable memory device and displaying confirmation of the association.

BACKGROUND

A storage device, such as a memory card, including a wireless antenna, is known in the art.

DESCRIPTION OF THE DRAWINGS

FIG. 28 schematically illustrates a configuration of an information processing system according to a second embodiment.

FIG. 29 is a flowchart illustrating a process of registering an accessory ID according to the second embodiment.

DETAILED DESCRIPTION

Figure 1:
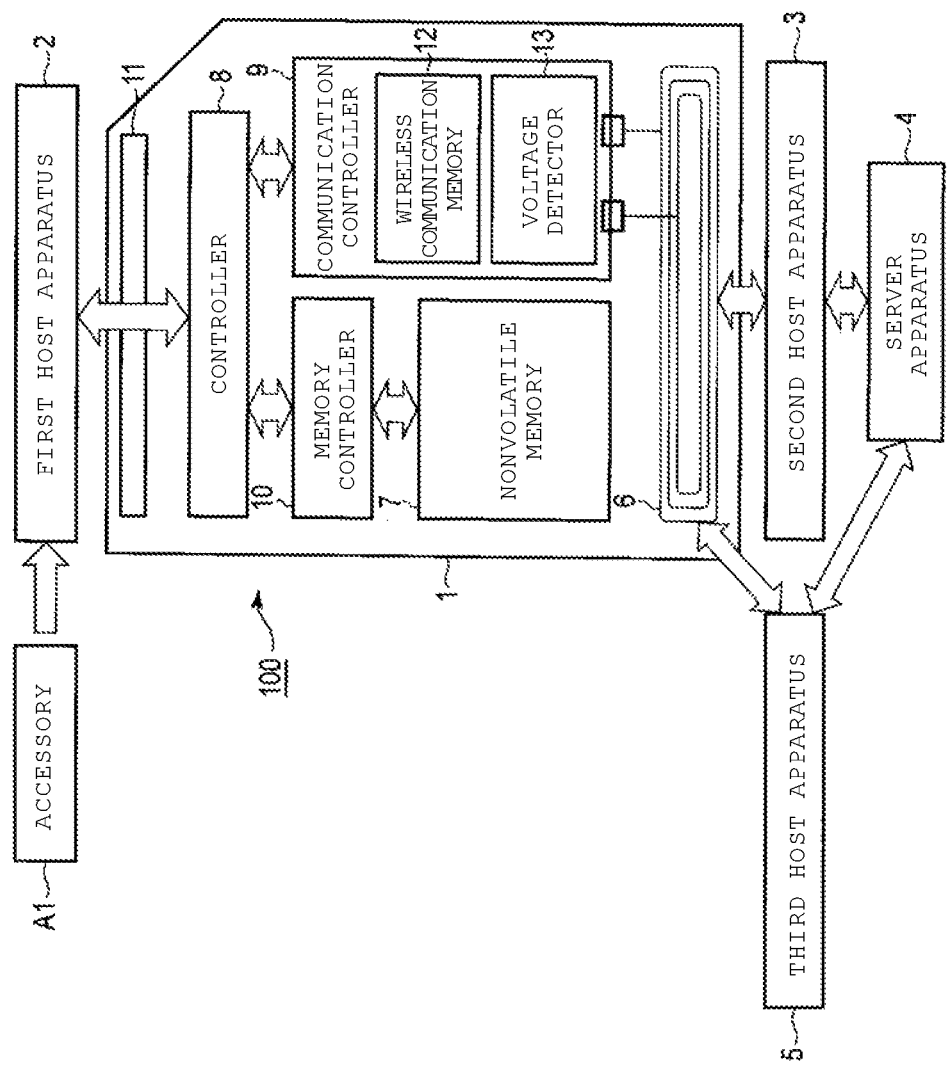
FIG. 1 is a block diagram of an information processing system according to the first embodiment, which include a wireless storage device that has a wireless communication function.

An embodiment provides an information processing system that updates content displayed in a captured image of a storage device using a wireless communication function of the storage device.

In general, according to an embodiment, a method of dynamically associating an accessory ID with a portable memory device and displaying confirmation of the association is carried out in a system where data generated in connection with an accessory ID may be stored in one of a plurality of portable memory devices. The method includes the steps of: when an accessory and a first portable memory device are coupled with a host apparatus, detecting the accessory ID of the accessory and storing the accessory ID in the first portable memory device; wirelessly transmitting the accessory ID and a device ID of the first portable memory device to a user computing device for registration of the accessory ID and the device ID of the first portable memory device in association with one another; and subsequent to the registration, upon determining that a code that is captured from a portable memory devices uniquely corresponds to that of the first portable memory device, retrieving an image corresponding to the accessory ID that is registered in association with the device ID of the first portable memory device, and displaying the image on a display device for visual confirmation that the portable memory device contains the data generated in connection with the accessory ID.

Hereinafter, embodiments will be described with reference to the drawings. In the following description, the same reference numerals are used for nearly or substantially same functions and elements, and the description thereof will be made as necessary.

First Embodiment

FIG. 1 is a block diagram of an information processing system. 100 and a wireless storage device 1 according to a first embodiment.

Figure 2:
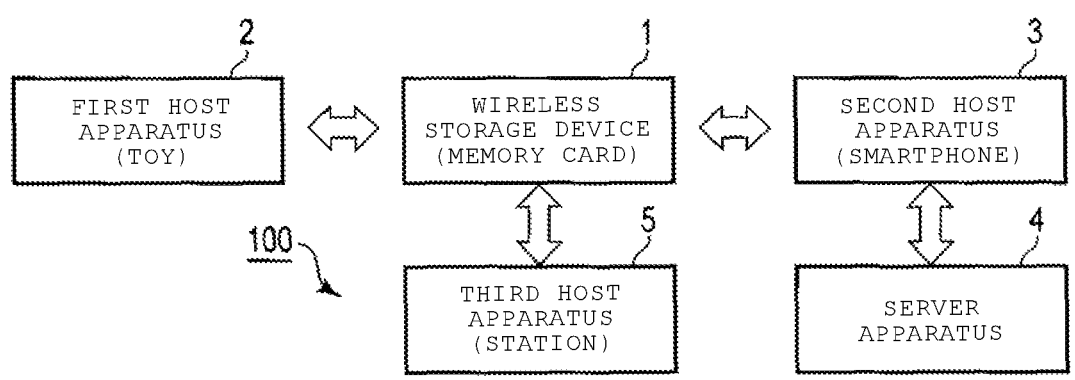
FIG. 2 schematically illustrates a configuration of the information processing system according to the first embodiment.

FIG. 2 is a block diagram exemplifying a configuration of the information processing system 100 including the wireless storage device 1 according to the present embodiment.

The information processing system 100 includes the wireless storage device 1, a first host apparatus 2, a second host apparatus 3, a server apparatus 4, a third host apparatus 5. The information processing system 100 is, for example, a toy system.

The wireless storage device 1 may be, for example, any of various storage devices such as a memory card (SD memory card, a multimedia card, or the like) and a universal serial bus (USB) memory.

The first host apparatus 2 is, for example, a toy. A user can mount toy goods (hereinafter referred to as an accessory) A1 on the first host apparatus 2 and can replace the mounted accessory A1 with another accessory. The first host apparatus 2 includes, for example, a slot. The user can insert the wireless storage device 1 into the slot of the first host apparatus 2. The first host apparatus 2 is electrically connected to the wireless storage device 1 inserted into the slot, and transmits and receives data, signals, information, commands, instructions, and the like to and from the wireless storage device 1.

The first host apparatus 2 may perform bidirectional communication with the accessory A1 and with the wireless storage device 1. The communication between the first host apparatus 2 and the accessory A1 is not limited to the bidirectional communication. For example, the first host apparatus 2 may read information contained in the accessory A1. The information contained in the accessory A1 may be, for example, an accessory ID or sound data corresponding to the accessory A1.

For example, the accessory A1 is an accessory corresponding to the first host apparatus 2. More specifically, the accessory A1 is a keychain, a strap, a medal, a card, or the like. For example, the accessory A1 has as an optically-readable code or a groove indicating the accessory ID (content information). In that case, the accessory ID can be optically read by the first host apparatus 2.

The accessory ID may be an ID unique to the accessory A1 or an ID indicating classification of the accessory A1. The accessory ID corresponds to, for example, a character (content). That is, the accessory ID may be associated with a character, or image data of the character may be associated with the accessory ID. In the present embodiment, the image data corresponding to the accessory ID is assumed to be stored in an information storage unit (first information storage unit) 4a of the server apparatus 4, but an exemplary embodiment is not limited thereto.

Further, the accessory A1 may contain a terminal apparatus ID in addition to the accessory ID. In this case, the terminal apparatus ID may be also optically read by the first host apparatus 2 in addition to the accessory ID.

In the present embodiment, the accessory ID may include the terminal apparatus ID. When the accessory ID includes the terminal apparatus ID, management of data and communication of data can become efficient and simple.

The terminal device ID may be an ID unique to the first host apparatus 2 or may be an ID indicating classification of the first host apparatus 2. The first host apparatus 2 may manage the terminal apparatus ID and transmit the terminal apparatus ID to the wireless storage device 1.

The second host apparatus 3 is an information processing apparatus that has a communication function, such as a smart phone or a mobile phone. In the present embodiment, the second host apparatus 3 can transmit and receive data, signals, information, commands, instructions, and the like to and from the wireless storage device 1 and can transmit and receive data, signals, information, commands, instructions, and the like to and from the server apparatus 4.

The server apparatus 4 is an information processing apparatus that transmits and receives data, signals, information, commands, instructions, and the like to and from the second host apparatus 3 and the third host apparatus 5 in a wired or wireless manner. The server apparatus 4 has a function of a service site that provides various services to users.

In the present embodiment, near field communication (NFC), which is a short-range wireless communication standard with a frequency of, for example, 13.56 MHz or the like, is used as the wireless communication by the wireless storage device 1. However, the wireless communication by the wireless storage device 1 may be, for example, another wireless communication such as a wireless local area network (LAN). The NFC enables communication at lower power than a general wireless LAN.

The wireless storage device 1 has a function of storing and reading data from the first host apparatus 2 using power supplied from the first host apparatus 2 and a function of data communication with the second host apparatus using power generated (induced) by electromagnetic induction of a wireless antenna 6 even when not being electrically connected to the second host apparatus 3. That is, for example, the wireless storage device 1 performs wireless communication to transmit or receive data to and from the second host apparatus 3 and the third host apparatus 5. Even when power is not supplied from the first host apparatus 2, the wireless storage device 1 can operate at least partially by power generated by the electromagnetic induction based on radio waves from the second host apparatus 3 or the third host apparatus 5.

In the present embodiment, the wireless storage device 1 transmits and receives data to and from the first host apparatus 2 in accordance with, for example, an SD interface, but another interface may be used. The wireless storage device 1 transmits and receives data to and from the second host apparatus 3 and the third host apparatus 5 in accordance with, for example, an NFC interface, but another wireless communication interface may be used.

The wireless storage device 1 includes the wireless antenna 6, a nonvolatile memory 7, a controller 8, a communication controller 9, a memory controller 10, and a connection unit 11. The communication controller 9 includes a wireless communication memory 12 and a voltage detector 13. The communication controller 9 and the wireless communication memory 12 may be provided separately from each other. The controller 8, the communication controller 9, and the memory controller 10 can be provided integrally or separately.

The controller 8, the memory controller 10, and the nonvolatile memory 7 operate when the wireless storage device 1 receives power from the first host apparatus 2. When the wireless storage device 1 receives power through only the wireless antenna 6, the controller 8, the memory controller 10, and the nonvolatile memory 7 may not necessarily operate. On the other hand, the communication controller 9 can operate even when the wireless storage device 1 receives power through only the wireless antenna 6. That is, when the wireless antenna 6 receives wireless radio waves with a predetermined frequency corresponding to the NFC, the communication controller 9 can operate and the wireless storage device 1 can communicate by the NFC.

The nonvolatile memory 7 may be, for example, a nonvolatile semiconductor memory. The nonvolatile memory 7 is, for example, a NAND flash memory, but may be another nonvolatile semiconductor memory such as an NOR flash memory, a magnetoresistive random access memory (MRAM), a phase change random access memory (PRAM), a resistive random access memory (ReRAM), or a ferroelectric random access memory (FeRAM). For example, the nonvolatile memory 7 may be another nonvolatile memory or a magnetic memory.

The nonvolatile memory 7 operates, for example, when the first host apparatus 2 supplies power to the wireless storage device 1.

In the present embodiment, the nonvolatile memory 7 stores, for example, a user ID, a password, the accessory ID (or an update accessory ID), time data, and a movement flag of a user of the first host apparatus 2.

The controller 8 receives a command CMD, an address ADD, data DAT from the first host apparatus 2, the memory controller 10, and the communication controller 9.

The controller 8 outputs the command CMD, the address ADD, and the data DAT to the memory controller 10, the communication controller 9, and the first host apparatus 2 based on the received command CMD.

In the present embodiment, the controller 8 may operate based on software such as firmware, an operation system, or an application program.

The controller 8 stores, in the nonvolatile memory 7, the user ID and the password corresponding to the user, the accessory ID (or the update accessory ID) indicating the accessory A1 that has been used by the first host apparatus 2, time data at which the accessory ID was stored, and the movement flag in association with each other. Accordingly, the nonvolatile memory 7 serves as a storage unit (content storage unit) that stores the accessory ID (or the update accessory ID: content update information).

The movement flag indicates whether or not combination of the user ID, the password, the accessory ID (or the update accessory ID), and the time data stored in the nonvolatile memory 7 has been moved (or copied or transferred) to the wireless communication memory 12.

The controller 8 performs, for example, mirroring to cause data which are to be identical between the nonvolatile memory 7 and the wireless communication memory 12 to have identical content.

For example, when mirroring target data is stored or updated in one of the nonvolatile memory 7 and the wireless communication memory 12, the controller 8 stores or update data of the identical content in the other of the nonvolatile memory 7 and the wireless communication memory 12 through the mirroring.

The controller 8 performs the mirroring, for example, when the user inserts the wireless storage device 1 into the first host apparatus 2 in a power-feeding state of the wireless storage device 1. Here, even when no power is electrically supplied from the wireless storage device 1 to the first host apparatus 2, the wireless storage device 1 can receive data from the first host apparatus 2. Therefore, for example, the controller 8 may perform a process such as the mirroring when no power is electrically supplied from the wireless storage device 1 to the first host apparatus 2.

In the present embodiment, mirroring target data is, for example, the user ID, the password, the accessory ID (or the update accessory ID), or the time data.

For example, when the controller 8 receives an instruction from the second host apparatus 3 or the nonvolatile memory 7 stores a new accessory ID (or an update accessory ID), the controller 8 may move data from the nonvolatile memory 7 to the wireless communication memory 12.

The controller 8 may compress and store data stored in the wireless communication memory 12. The controller 8 performs the compression using, for example, a Huffman code. When the controller 8 reads data stored in the wireless communication memory 12, the controller 8 decompresses compressed data, reads the decompressed data, and outputs the data as read data. The controller 8 may compress or decompress data. Alternatively, the wireless storage device 1 may include a compressor and a decompressor separately from the controller 8, and the controller 8 may cause the compressor to compress data and causes the decompressor to decompress data.

The memory controller 10 controls the nonvolatile memory 7. For example, the memory controller 10 stores data in the nonvolatile memory 7 based on the command CMD or the like input from the controller 8. For example, the memory controller 10 reads data from the nonvolatile memory 7 based on the command CMD or the like input from the controller 8 and outputs the data to the controller 8. The memory controller 10 may communicate with the communication controller 9 or the first host apparatus 2 without passing though the controller 8.

The wireless antenna 6 is, for example, a PCB pattern antenna. A frequency band in which the wireless antenna 6 can operate may be a predetermined frequency band corresponding to the NFC.

For example, the wireless antenna 6 can generate power by electromagnetic induction based on radio waves from the second host apparatus 3. The wireless antenna 6 supplies the generated power to the communication controller 9.

The wireless antenna 6 receives the command CMD, the address ADD, and the data DAT from the second host apparatus 3. The wireless antenna 6 outputs the received command CMD to the communication controller 9.

The communication controller 9 performs communication with the second host apparatus 3 and the third host apparatus 5 via the wireless antenna 6. The communication controller 9 receives the command CMD, the address ADD, and the data DAT from the controller 8 or the wireless antenna 6. The communication controller 9 outputs, for example, the data DAT or the like to the controller 8 or the wireless antenna 6 based on the received command CMD. The communication controller 9 reads the data DAT from the wireless communication memory 12 based on the received command CMD or address ADD and outputs the data DAT to the controller 8 or the wireless antenna 6. Further, the communication controller 9 stores the data DAT in the wireless communication memory 12 based on the received command CMD, address ADD, and data DAT.

The command CMD, the address ADD, and the data DAT communicated among the first host apparatus 2, the controller 8, the memory controller 10, the communication controller 9, and the wireless antenna 6 may not necessarily have the same format. When the command CMD, the address ADD, and the data DAT can be recognized by both communication sides, the command CMD, the address ADD, and the data DAT may not have a format same as that of the command CMD, the address ADD, and the data DAT communicated with the other apparatus.

The communication controller 9 stores the data DAT in the wireless communication memory 12 when the communication controller 9 receives the data storing command CMD and data DAT via the controller 8 or the wireless antenna 6. The communication controller 9 may not necessarily write data in the wireless communication memory 12.

The wireless communication memory 12 is, for example, a nonvolatile memory. The wireless communication memory 12 stores data under control of the communication controller 9 or the memory controller 10. The data may be temporarily stored in the wireless communication memory 12. For example, an electrically erasable programmable read-only memory (EEPROM) is used for the wireless communication memory 12, but any of various memories that can be used for the nonvolatile memory 7 can be used for the wireless communication memory 12.

To operate the wireless communication memory 12 with the power supplied from the wireless antenna 6, it is desirable that power consumption per unit capacity of the wireless communication memory 12 is lower than that of the nonvolatile memory 7. Specifically, an NOR type memory may be suitably used.

In the present embodiment, the wireless communication memory 12 stores some or all of the data stored in the nonvolatile memory 7. For example, the wireless communication memory 12 stores the user ID, the password, the accessory ID (or the update accessory ID), the transmission flag, and the time data.

The transmission flag indicates whether or not the wireless storage device 1 has transmitted the user ID, the password, the accessory ID (or the update accessory ID), and the time data stored in the wireless communication memory 12 to the second host apparatus 3.

The transmission flag also indicates whether or not the wireless storage device 1 has transmitted the user ID, the password, the accessory ID (or the update accessory ID), and the time data stored in the wireless communication memory 12 to the server apparatus 4 via the second host apparatus 3 and registers the accessory ID and the time data in a user account set in the server apparatus 4. The update accessory ID is assumed to be an accessory ID in which data for identifying an updated portion is added to the accessory ID, but an exemplary embodiment is not limited thereto.

The wireless communication memory 12 may store, for example, some of relevant data of the wireless storage device 1 (some of data (for example, image data, sound data (music data, voice data, or the like), and video data) stored in the nonvolatile memory 7, data associated with data stored in the nonvolatile memory 7, and data related to the nonvolatile memory 7 and the wireless storage device 1), data associated with the second host apparatus 3, or data associated with the accessory A1 mounted on the first host apparatus 2 and the command CMD received from the controller 8 or the second host apparatus 3.

Specific examples of the data stored in the wireless communication memory 12 are as follows. The specific examples are merely examples and data stored in the wireless communication memory 12 is not limited thereto.

The data associated with the image data stored in the nonvolatile memory 7 is, for example, file name data, an initial or final portion of the image data, thumbnail image data of the image data, file generation time data, image capturing time data, or a data ID.

The data associated with the sound data stored in the nonvolatile memory 7 is, for example, file name data, an initial or final portion of the sound data, reproduction time data of the sound data, file generation time data, or a data ID.

The data associated with the nonvolatile memory 7 is, for example, data of a memory capacity of the nonvolatile memory 7, data of a remaining capacity, or data of the number of stored files.

The data related to the wireless storage device 1 is, for example, a storage device ID (first information: an identification number arbitrarily assigned to the wireless storage device 1, for example, a unique product ID assigned at the time of manufacturing or an ID arbitrarily assigned to each wireless storage device 1 later), a comment (text data stored in the wireless storage device 1 via the first host apparatus 2 by the user and associated with the wireless storage device 1), and an identification ID (second information) printed on a retention region 1a (see FIG. 4) of the wireless storage device 1. Accordingly, the nonvolatile memory 7 serves as a second information storage unit that stores the storage device ID (first information) for specifying the wireless storage device 1.

The data associated with the first host apparatus 2 is, for example, the terminal apparatus ID of the first host apparatus 2, update information of firmware of the first host apparatus 2, or flag information generated based on such information.

The data associated with the accessory A1 is, for example, the accessory ID for identifying the accessory A1, data included in a code of the accessory A1, or flag information generated from the data. Further, when a character of the accessory A1 is updated in response to upgrade of the character of the accessory A1, the data associated with the accessory A1 includes the update accessory ID to which data for identifying an updated state is added. The update accessory ID may include image data of an upgraded character.

The voltage detector 13 is electrically connected to the wireless antenna 6. The voltage detector 13 detects a voltage applied by the wireless antenna 6 to the communication controller 9. Then, the voltage detector 13 outputs a reset command of NFC communication until the voltage reaches a predetermined voltage, at which the communication controller 9 can operate. The communication controller 9 does not perform the NFC communication while the reset command is received. The reset command can prevent an abnormal activation or operation of the NFC communication. When the voltage reaches the predetermined voltage, the voltage detector 13 may output an operation enable command to the communication controller 9. In that case, the communication controller 9 performs the NFC communication only when the operation enable command is received.

The connection unit 11 is, for example, a standardized connection terminal and connectable to the first host apparatus 2.

Figure 3:
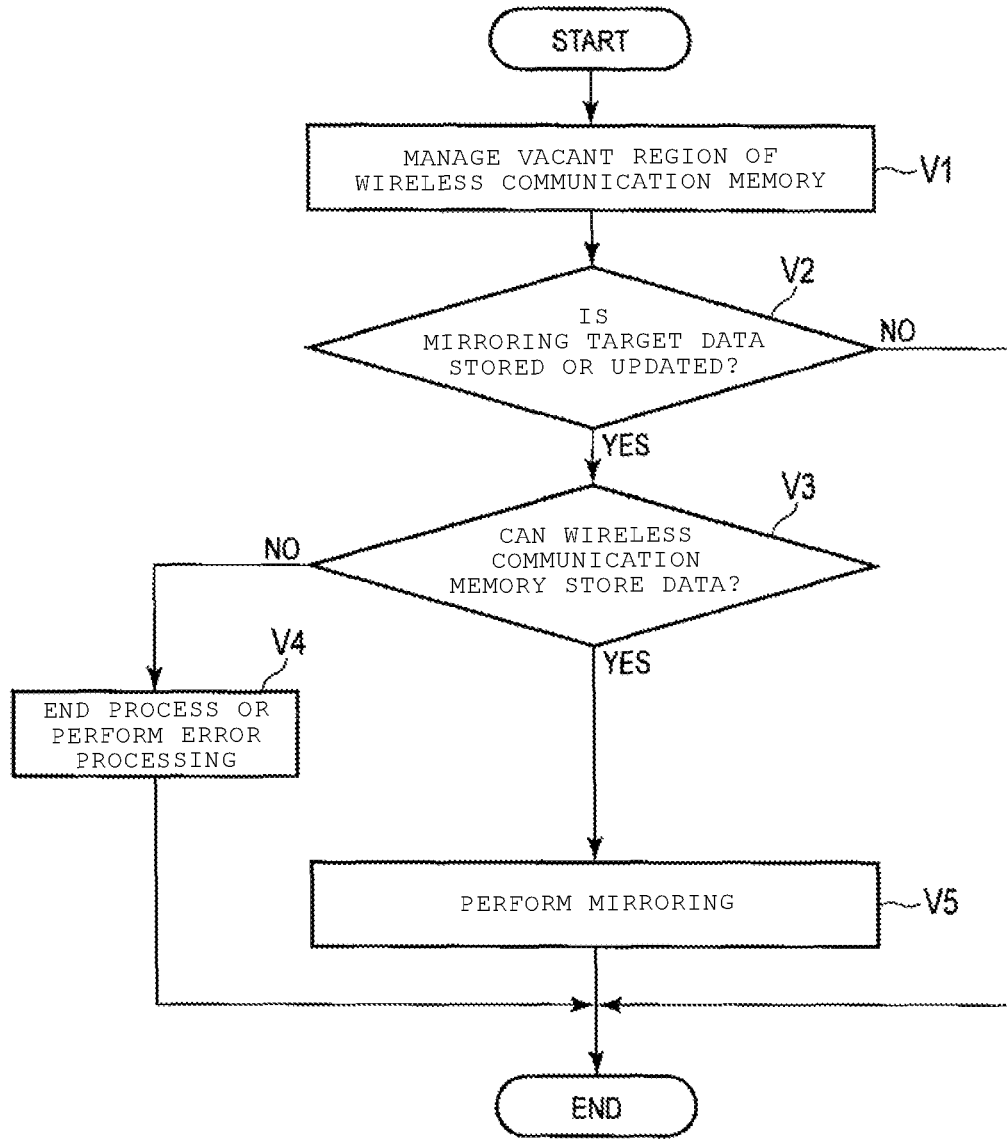
FIG. 3 is a flowchart illustrating steps of mirroring performed by a controller of the wireless storage device according to the first embodiment.

FIG. 3 is a flowchart of steps of the mirroring performed by the controller 8 according to the present embodiment.

In step V1, the controller 8 manages a status indicating whether or not the wireless communication memory 12 can store data based on a position of a vacant region of the wireless communication memory 12, a data capacity of the vacant region, and the number of accessory IDs (or the update accessory IDs) stored in the wireless communication memory 12. For example, when the data capacity of the vacant region is equal to or greater than a first threshold value, the controller 8 sets the status so as to indicate that the wireless communication memory 12 can store data. For example, when the number of accessory IDs stored in the wireless communication memory 12 is equal to or less than a second threshold value, the controller 8 sets the status so as to indicate that the wireless communication memory 12 can store data.

In step V2, the controller 8 determines whether or not mirroring target data is stored or updated in at least one of the nonvolatile memory 7 and the wireless communication memory 12.

The process ends when it is determined that the mirroring target data is not stored or updated in at least one memory.

When it is determined that the mirroring target data is stored or updated in at least one memory (Yes in step V2), the controller 8 determines whether or not the wireless communication memory 12 can store data based on the status in step V3.

When it is determined that the wireless communication memory 12 may not store the data (No in step V3), the controller 8 ends the process or performs error processing in step V4.

When it is determined that the wireless communication memory 12 can store the data (Yes in step V3), the controller 8 performs the mirroring in step V5. For example, the controller 8 selects data associated with time data indicating a new time as data for which the mirroring is permitted in association with the movement flag indicating non-movement from the nonvolatile memory 7 and moves the selected data from the nonvolatile memory 7 to the wireless communication memory 12. In this way, by selecting the new data, the controller 8 can store, for example, data associated with a toy that was used recently by a user in the wireless communication memory 12.

Figure 4:
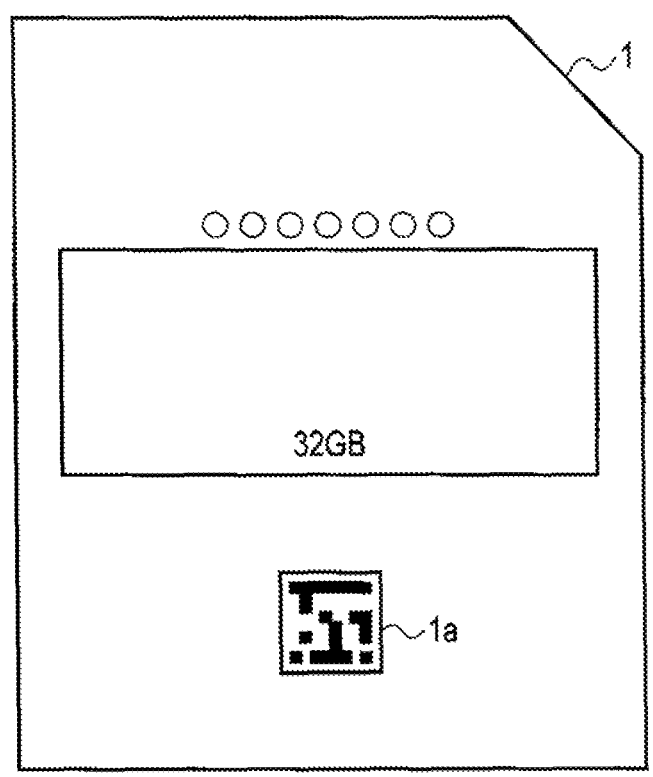
FIG. 4 illustrates an outer surface of the wireless storage device according to the first embodiment.

FIG. 4 illustrates an outer surface of the wireless storage device 1.

The wireless storage device 1 includes the retention region 1a that indicates the identification ID (second information) of the wireless storage device 1. In the present embodiment, the identification ID is indicated in the retention region 1a on which a seal printed in a QR code (registered trademark) format is adhered. The printing format of the identification ID may not be the QR code format as long as the ID can be optically readable. In the wireless storage device 1, the retention region 1a can be located at any position as long as the ID can be optically read by another apparatus (for example, the second host apparatus 3). The retention region 1a may be located not only on one surface of the wireless storage device 1 but also on both surfaces of the wireless storage device 1.

Figure 5:
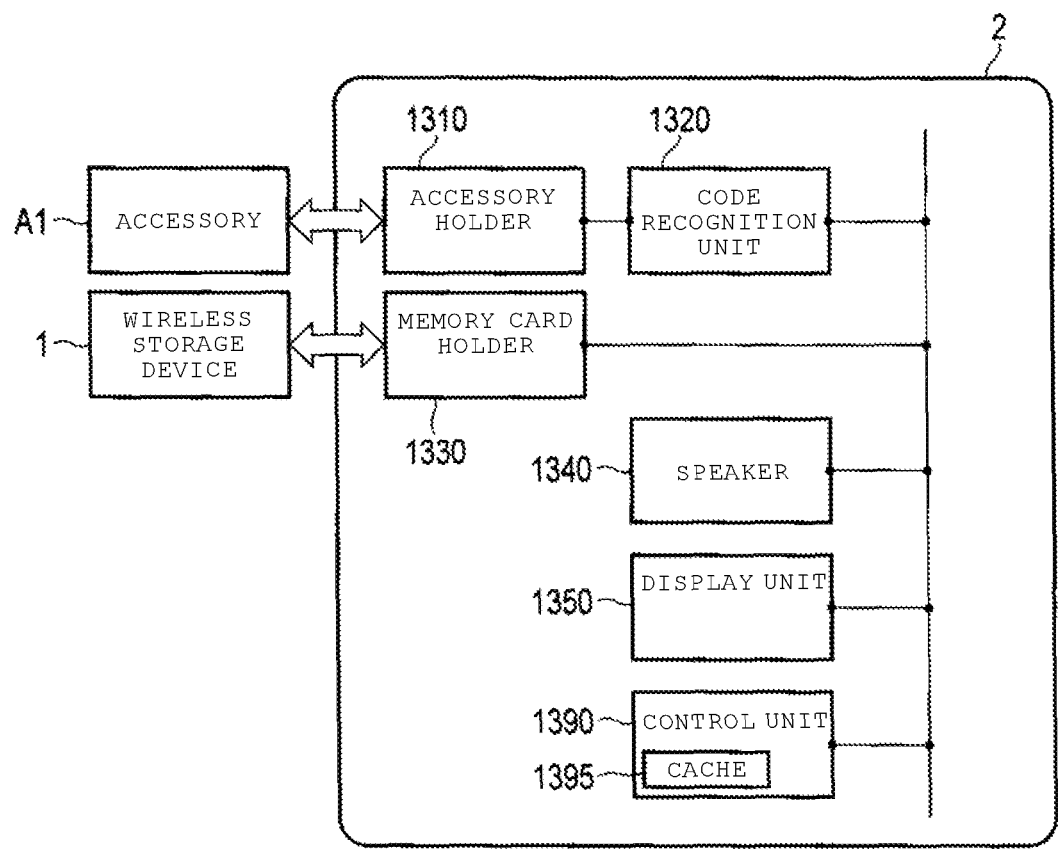
FIG. 5 is a block diagram of a first host apparatus according to the first embodiment.

FIG. 5 is a block diagram of the first host apparatus 2 according to the present embodiment.

The first host apparatus 2 includes an accessory holder 1310, a code recognition unit 1320, a memory card holder 1330, a speaker 1340, and a control unit 1390.

A storage device, for example, a memory card, can be inserted into the memory card holder 1330 from the outside. In the present embodiment, the memory card holder 1330 is configured to hold the wireless storage device 1, i.e., a memory card having an NFC chip.

For example, the accessory holder 1310 is configured to hold the accessory A1 inserted from the outside. The accessory holder 1310 may hold the accessory A1 without being inserted from the outside. For example, the accessory holder 1310 may be a ring-shaped holder that holds the accessory A1, which is implemented as a keychain.

The accessory A1 is, for example, a card on which a character is depicted. For example, one character is depicted on one accessory A1. However, an exemplary embodiment is not limited thereto, and a plurality of characters may be depicted on one accessory A1. Information (accessory ID) regarding the character is contained in the accessory A1. The accessory A1 has this information in an optically-readable code format, for example. However, an exemplary embodiment is not limited thereto. For example, the accessory A1 may include an NFC chip and the information regarding the character may be electronically stored in the NFC chip. When the information regarding the character is electronically stored in the NFC chip or an NFC tag, data can be changed later and upgrade of the character can be easily performed by the information processing system 100, for example.

When the information regarding the character is contained in an optically-readable code and the accessory A1 is held in the accessory holder 1310, the code of the accessory A1 confronts (faces) the code recognition unit 1320 of the first host apparatus 2.

The code recognition unit 1320 receives an instruction from the outside, reads the information regarding the character from the code of the accessory A1, and transmits the information regarding the character to the wireless storage device 1. The information regarding the character includes address information which is to be read by the nonvolatile memory 7 included in the wireless storage device 1.

The controller 8 of the wireless storage device 1 receives the information regarding the character and reads the corresponding information. Specifically, the controller 8 outputs a read instruction and an address to the memory controller 10, and then the memory controller 10 reads data from the address of a memory corresponding to the information regarding the character and outputs the data to the controller 8. Then, the wireless storage device 1 outputs the data to the speaker 1340.

The speaker 1340 converts the data into sound data through a DA converter (not illustrated) and generates sound based on the sound data. The user can hear the sound corresponding to the accessory A1 held in the first host apparatus 2.

Alternatively, the speaker 1340 may generate the sound based on data read directly from the accessory A1.

The first host apparatus 2 may include a display unit (display) 1350. When the read data includes sound data and moving-image data, the first host apparatus 2 may output the sound from the speaker 1340 and displays a moving image corresponding to the moving-image data on the display unit 1350. The first host apparatus 2 may display the moving image on the display unit 1350 without outputting the sound from the speaker 1340.

The control unit 1390 controls the code recognition unit 1320, the speaker 1340, and the display unit 1350. Also, the control unit 1390 communicates with the wireless storage device 1. The control unit 1390 may include a cache storage device 1395. The cache storage device 1395 temporarily store data.

Figure 6:
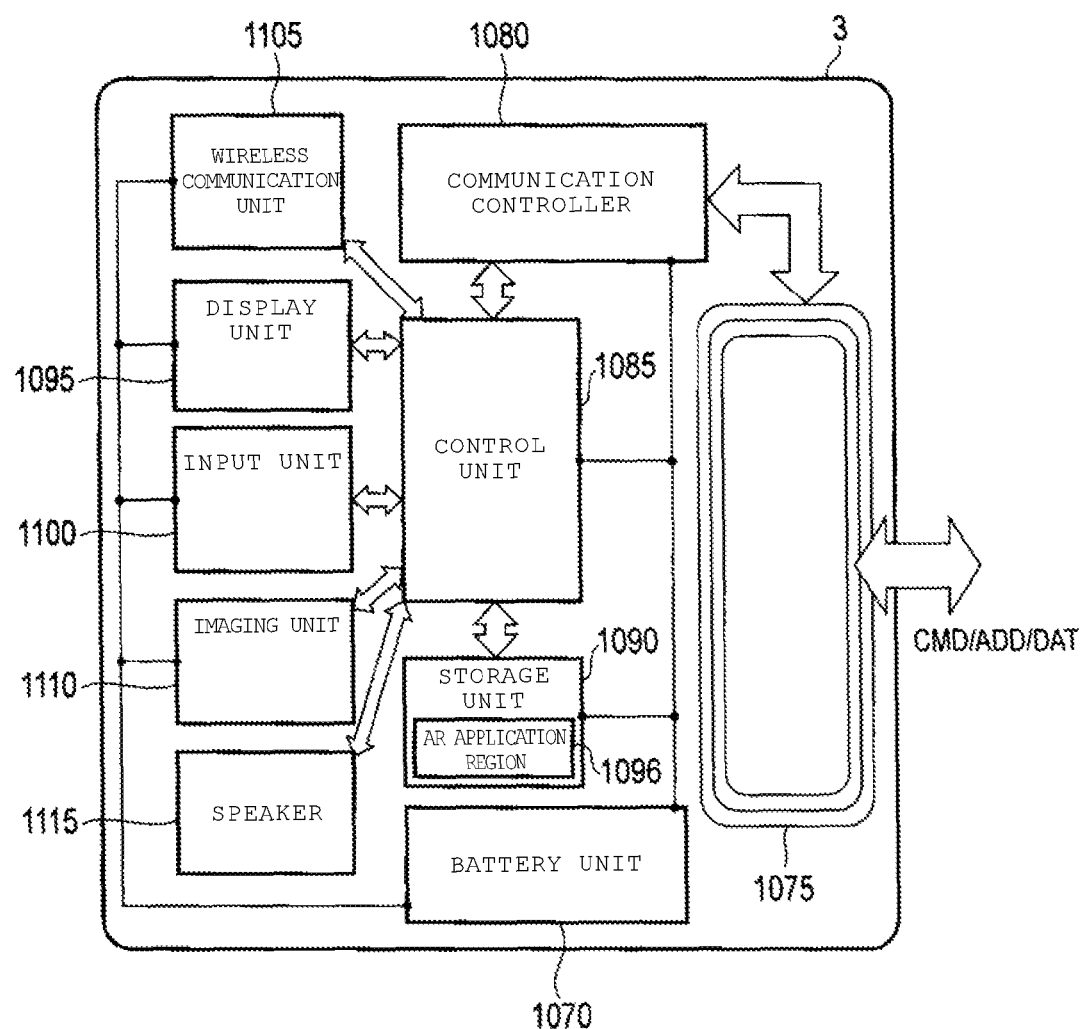
FIG. 6 is a block diagram of a second host apparatus according to the first embodiment.

FIG. 6 is a block diagram of the second host apparatus 3 according to the present embodiment.

The second host apparatus 3 is, for example, an apparatus that has a wireless communication function, such as a smart phone, a personal digital assistant (PDA), or a tablet terminal.

The second host apparatus 3 includes a battery unit 1070, a wireless antenna 1075, a communication controller 1080, a control unit 1085, a storage unit 1090 including an AR application region 1096, a display unit 1095, an input unit 1100, a wireless communication unit 1105, an imaging unit 1110, and a speaker 1115. The communication controller 1080 and the control unit 1085 may be provided as one controller.

The second host apparatus 3 can operate and communicate using power supplied from the battery unit 1070.

The second host apparatus 3 can transmit and receive data according to, for example, an NFC interface. The second host apparatus 3 may use another wireless communication interface.

The battery unit 1070 is a power source that supplies power to the second host apparatus 3. The battery unit 1070 is, for example, a battery cell. The battery unit 1070 may be a dry cell, a secondary battery, or a fuel cell. More specifically, a lithium ion battery or the like may be used as the battery unit 1070. The battery unit 1070 may be located outside the second host apparatus 3 or may be an AC adapter connected to, for example, a commercial power source.

A frequency band of the wireless antenna 1075 is set to a predetermined frequency band corresponding to the NFC.

The wireless antenna 1075 receives the command CMD, the address ADD, and the data DAT and outputs the received data to the communication controller 1080. Also, the wireless antenna 1075 outputs the command CMD, the address ADD, and the data DAT input from the communication controller 1080. The wireless antenna 1075 is, for example, a PCB pattern antenna.

The communication controller 1080 controls the wireless antenna 1075. The communication controller 1080 can output, via the wireless antenna 1075, the command CMD, the address ADD, and the data DAT received from the control unit 1085. Also, the communication controller 1080 can output the data received from the wireless antenna 1075 to the control unit 1085.

For example, the control unit 1085 controls operations of each unit of the second host apparatus 3 based on inputs from the input unit 1100, the wireless communication unit 1105, the imaging unit 1110, and the wireless storage device 1. The control unit 1085 controls each unit based on input data or a calculation result of the data and outputs a command to each unit as necessary.

The control unit 1085 is, for example, a semiconductor chip, a circuit formed on a substrate, or a combination with one or the plurality thereof. The control unit 1085 may include at least one of a cache storage device and a register, to temporarily store data.

The control unit 1085 can output the command CMD to the communication controller 1080 and output the address ADD and the data DAT to the wireless antenna 1075. The control unit 1085 receives the command CMD, the address ADD, and the data DAT received from the wireless antenna 1075 and the data read from the wireless storage device 1.

When data are written in the wireless storage device 1, the control unit 1085 outputs data input from each unit or a calculation result of the data, the write command CMD, and the address ADD to the communication controller 1080.

The control unit 1085 is electrically connected to each unit of the second host apparatus 3 and electrically communicates with each unit. That is, the control unit 1085 can receive data from each unit and output the data or a calculation result of the data.

For example, the control unit 1085 can calculate (generate) combined image data in which captured data obtained by the imaging unit 1110 is subjected to emphasis indication and output the combined image data to the display unit 1095.

For example, the control unit 1085 can calculate (generate) the combined image data based on image data read from the storage unit 1090 and output the combined image data to the display unit 1095.

For example, when the imaging unit 1110 captures the QR code in the retention region 1a, the control unit 1085 analyzes the captured image, extracts the identification ID obtained from the analyzed image, transmits information corresponding to the identification ID (in the present embodiment, the user ID, the password, the storage device ID of the wireless storage device 1) to the server apparatus 4, receives image information (image data of a character or update image data of the character) associated with formation (the storage device ID) corresponding to the identification ID from the server apparatus 4, and displays an image (content) of the character near a position of the captured image (displayed on the display unit 1095) at which the QR code is displayed (AR process).

The storage unit 1090 includes an AR application region 1096. The AR application region 1096 stores an application for performing the above-described AR processing function. When the control unit 1085 executes the application stored in the AR application region 1096, the AR processing function is performed.

The storage unit 1090 outputs the stored data to the control unit 1085 based on communication with the control unit 1085. Further, the storage unit 1090 stores data received from the control unit 1085 based on communication with the control unit 1085. The storage unit 1090 is, for example, a memory controller and a nonvolatile memory. Any of various memories that can be used for nonvolatile memory 7 can be used for the nonvolatile memory of the storage unit 100. The memory controller controls the nonvolatile memory. The storage unit 1090 may be, for example, a hard disk drive (HDD) or a solid state disk (SSD).

The display unit 1095 displays the data received from the control unit 1085 in a format which can be recognized by the user. The display unit 1095 is, for example, a display. The user can visually recognize indication of the display. Specifically, any of various displays such as a liquid crystal display, a plasma display, an organic EL display, and a 3-dimensional display may be used as the display unit 1095. The display unit 1095 displays data received from the control unit 1085. The display unit 1095 can display, for example, images captured by the imaging unit 1110 or a moving image concurrently captured by the image unit 1110.

The input unit 1100 outputs an input from the user as input data to the control unit 1085. The input unit 1100 is, for example, a touch panel provided integrally with the display. When the user touches a position on the display, the input unit 1100 detects the position of the touch panel and outputs information regarding the position as input data to the control unit 1085. Specifically, any of a switch disposed in a matrix form and various touch panels of a resistive membrane type, a surface elastic wave type, an infrared type, an electromagnetic induction type, and an electrostatic capacity type may be used as the input unit 1100.

The input unit 1100 may be, for example, a microphone. When the user utters a voice, the input unit 1100 may detect the voice, extract input data through voice conversion, and outputs the input data to the control unit 1085.

The wireless communication unit 1105 includes a wireless antenna and a wireless controller. The wireless communication unit 1105 transmits and receives data to and from the outside through wireless communication. The wireless communication unit 1105 outputs data received from the outside to the control unit 1085. The wireless communication unit 1105 transmits data received from the control unit 1085 to the outside.

The imaging unit 1110 can capture a still image, a moving image, or both thereof. The imaging unit 1110 outputs captured data (image data), that is, still image data or moving-image data, to the control unit 1085. The imaging unit 1110 can capture an image including the QR code in the retention region 1a of the wireless storage device 1. The imaging unit 1110 is, for example, a camera. More specifically, the imaging unit 1110 is a camera including a solid-state imaging element such as a charge coupled device (CCD) sensor or a complementary metal oxide semiconductor (CMOS) sensor.

The speaker 1115 reproduces sound data input from the control unit 1085.

Figure 7:
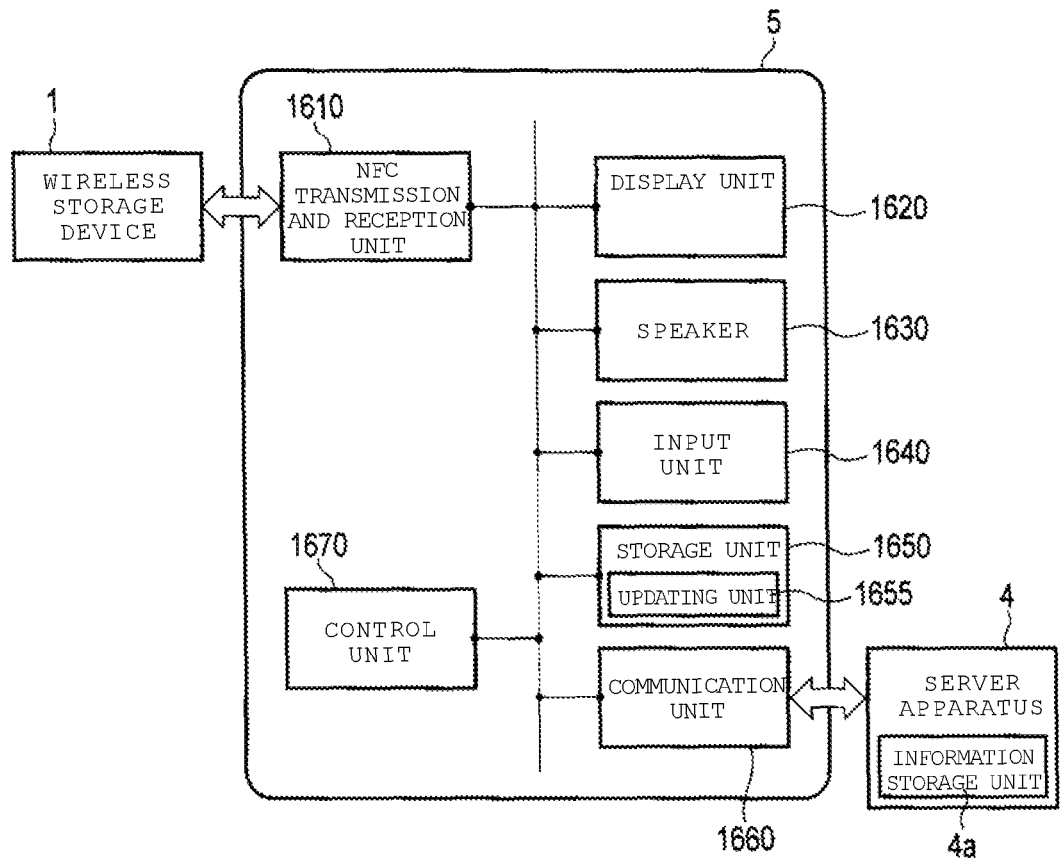
FIG. 7 is a block diagram of a third host apparatus according to the first embodiment.

FIG. 7 is a block diagram of the third host apparatus 5 according to the present embodiment.

The third host apparatus 5 is a station apparatus (e.g., kiosk) in the present embodiment. The station apparatus is, for example, a communication apparatus (information processing apparatus) located at a shopping mall, an electronic product shop, a toy store, or the like.

The third host apparatus 5 includes an NFC transmission and reception unit 1610, a display unit (display) 1620, a speaker 1630, an input unit 1640, a storage unit 1650, a communication unit 1660, and a control unit 1670.

The NFC transmission and reception unit 1610 performs NFC communication with the outside of the second host apparatus 3 in accordance with an instruction of the control unit 1670. For example, the NFC transmission and reception unit 1610 performs NFC communication with the wireless storage device 1.

The display unit 1620 is, for example, any display such as a liquid crystal display or an organic EL display. The display unit 1620 displays, for example, progress of NFC communication during the NFC communication and displays completion of the communication at the time of completion of the communication.

The speaker 1630 generates a sound in accordance with an instruction of the control unit 1670.

The input unit 1640 is, for example, a keyboard or a button. The display unit 1620 may be display and the touch panel may be the input unit 1640.

The storage unit 1650 includes an updating unit 1655. The storage unit 1650 is, for example, any storage device such as an HDD, an SSD, or a flash memory. The storage unit 1650 stores, for example, data to be transmitted to the outside. Examples of the data include the sound data and the moving-image data of the character.

The updating unit 1655 can cause the character stored in the wireless storage device 1 to be updated. That is, the updating unit 1655 transmits an update accessory ID (content update information) to the wireless storage device 1. The update accessory ID is transmitted, when the wireless storage device 1 and the third host apparatus 5 can communicate through a wireless or physical interface (e.g., in a predetermined event).

Here, the predetermined event is, for example, an upgrade event (or a status-up event) for a character. For example, in the upgrade event, a "sword" is granted to a character which has no weapon. Upon the update of the character, a display image of a character that has no weapon is updated to a display image of the character that has the weapon. In this way, information indicating that the display image of the character is upgraded is transmitted as the update accessory ID from the third host apparatus 5 to the wireless storage device 1.

The communication unit 1660 communicates with, for example, the external server apparatus 4 outside the third host apparatus 5 through wired or wireless communication in accordance with an instruction of the control unit 1670. The communication unit 1660 acquires data to be stored in the storage unit 1650 from the external server apparatus 4.

The control unit 1670 controls the NFC transmission and reception unit 1610, the display unit 1620, the speaker 1630, the input unit 1640, the storage unit 1650, and the communication unit 1660.

Figure 8A:
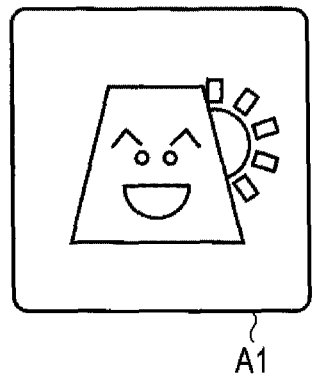
FIGS. 8A and 8B are a plan view of a terminal apparatus according to the first embodiment.
Figure 8B:
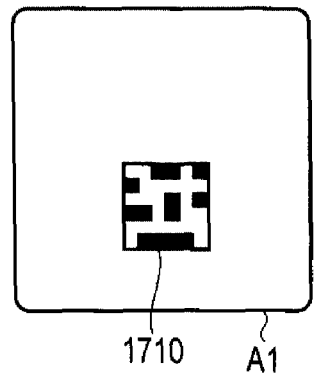

FIGS. 8A and 8B schematically illustrate the accessory A1 according to the present embodiment. FIG. 8A is a plan view of one surface (front surface) of the accessory A1. FIG. 8B is a plan view of the other surface (rear surface) of the accessory A1.

The accessory A1 includes, for example, a character and a code 1710. The code 1710 can be optically read by the code recognition unit 1320 of the first host apparatus 2.

Figure 9:
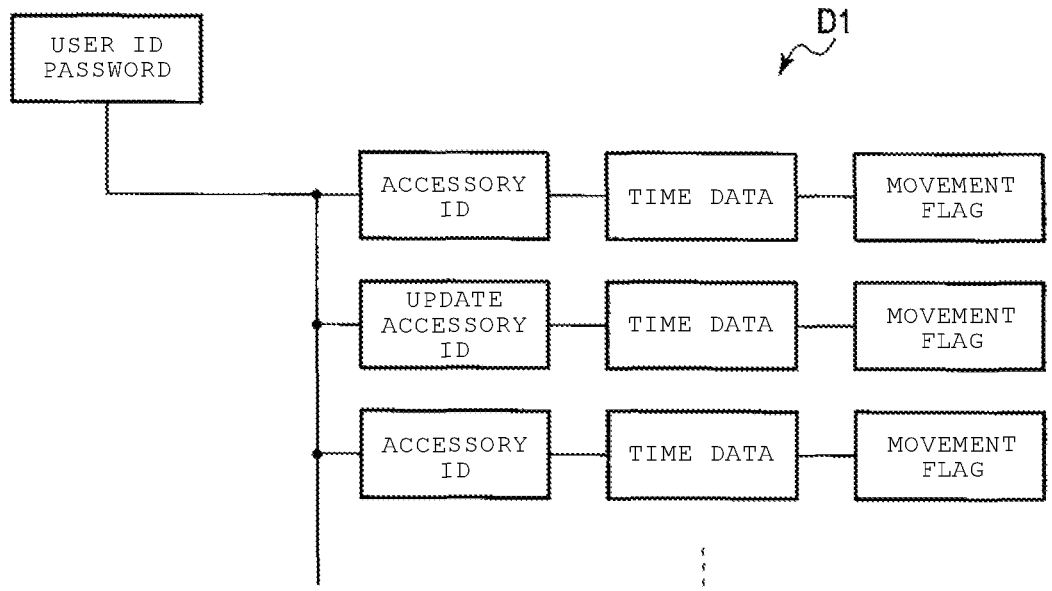
FIG. 9 illustrates a data structure of data stored in a nonvolatile memory of the wireless storage device according to the first embodiment.

FIG. 9 illustrates a data structure of data D1, which is stored in the nonvolatile memory 7 according to the present embodiment.

The controller 8 manages the data D1 stored in the nonvolatile memory 7 via the memory controller 10.

The data D1 includes a user ID and a password of a user. When the wireless communication memory 12 stores the password, the data D1 may not include the password.

Each time the user mounts a new accessory A1 on the first host apparatus 2, a new accessory ID is stored in the nonvolatile memory 7.

When the new accessory ID is added, data indicating a time at which the new accessory ID was stored are associated with the new accessory ID.

Even when the character of the accessory A1 is upgraded and the updated accessory ID is stored, data indicating a time at which the update accessory ID was stored are associated with the update accessory ID.

In the present embodiment, the data D1 include a movement flag indicating whether or not the user ID, the password, the accessory ID (or the update accessory ID), and the time data associated with each other have been moved from the nonvolatile memory 7 to the wireless communication memory 12.

Figure 10:
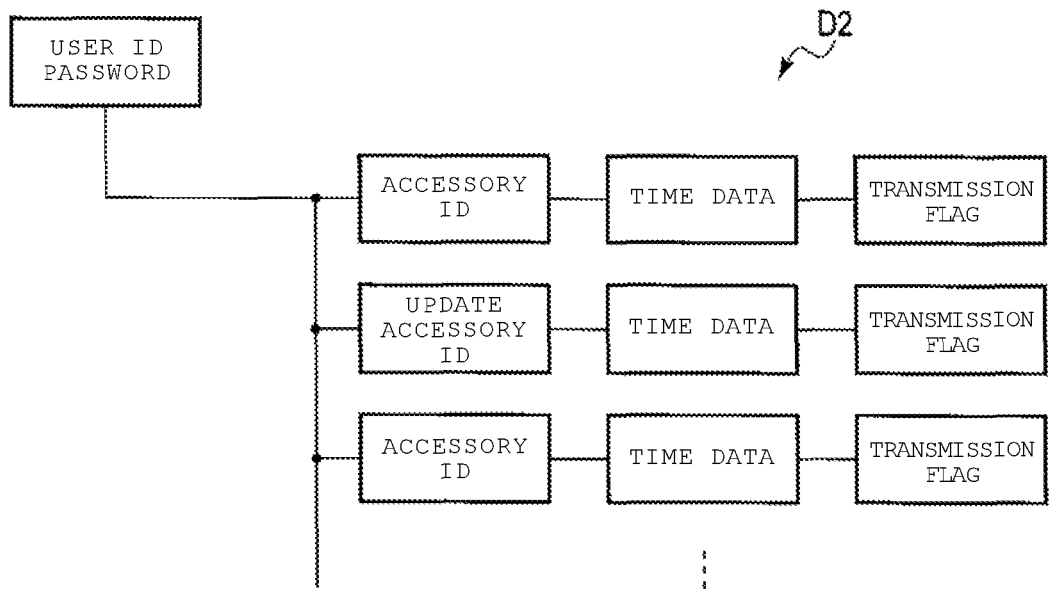
FIG. 10 illustrates a data structure of other data stored in the wireless storage device according to the first embodiment.

FIG. 10 illustrates a data structure of data D2, which are stored in the wireless communication memory 12 according to the present embodiment.

For example, when a stored data amount of the wireless communication memory 12 is small (the amount of stored data is equal to or less than a threshold value), the controller 8 extracts apart or all of the data D1 in the nonvolatile memory 7 and stores the selected or extracted data in the wireless communication memory 12. That is, the controller 8 reads or updates the data D2 of the wireless communication memory 12 via the communication controller 9.

The data D2 include, for example, a part or all of the data D1 in the nonvolatile memory 7. Specifically, the data D2 include the user ID and the password of the user.

The data D2 include a transmission flag indicating whether or not the user ID, the password, the accessory ID (or the update accessory ID), and the time data associated with each other have been transmitted from the wireless communication memory 12 to the second host apparatus 3, instead of the movement flag of the data D1.

In the data D2, data transmitted from the wireless communication memory 12 to the second host apparatus 3 can be identified by the transmission flag. However, the data which become unnecessary due to the transmission from the wireless communication memory 12 to the second host apparatus 3 in the data D2 may be deleted from the data D2.

Figure 11:
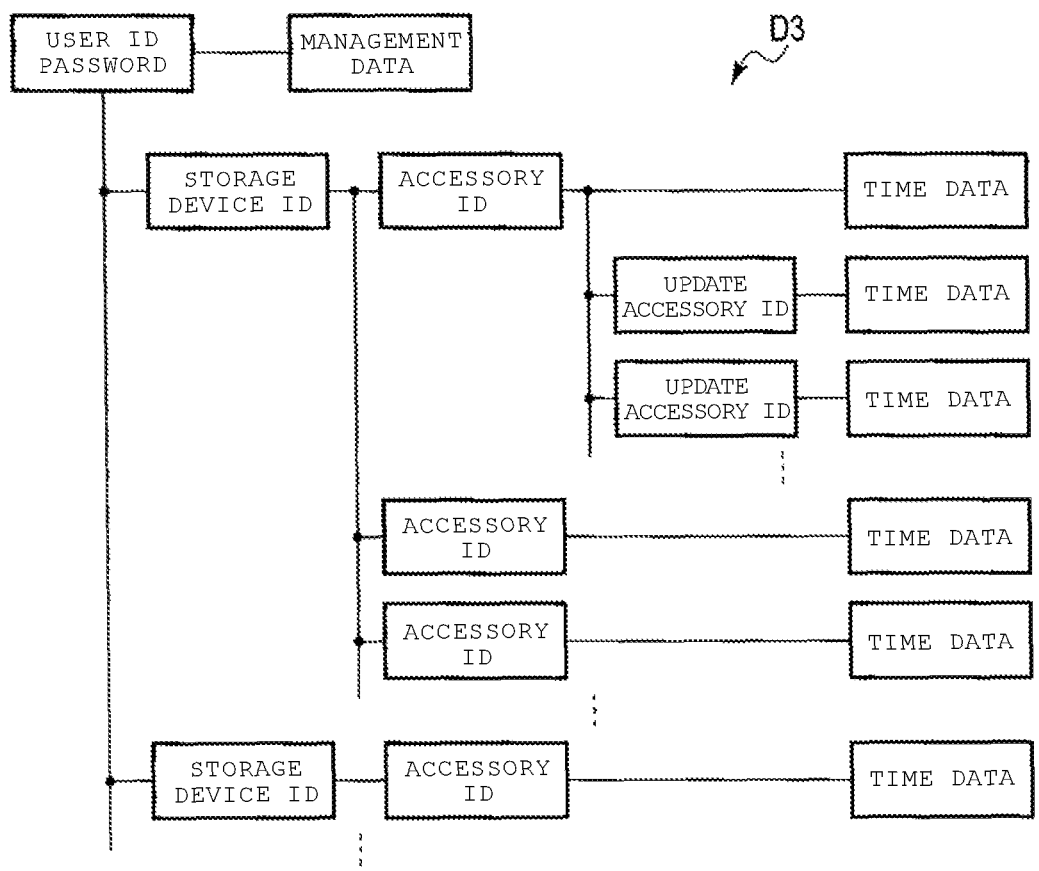
FIG. 11 illustrates a data structure of data stored in a server apparatus according to the first embodiment.
Figure 12:
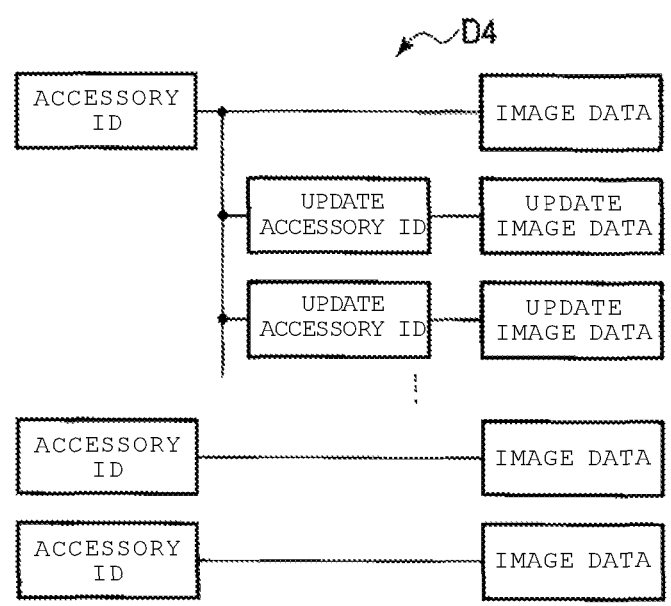
FIG. 12 illustrates a data structure of other data stored in the server apparatus according to the first embodiment.

FIGS. 11 and 12 illustrate a data structure of data D3 and data D4, which are stored in the information storage unit 4a of the server apparatus 4 according to the present embodiment.

The server apparatus 4 receives the user ID, the password, the storage device ID, the accessory ID (or the update accessory ID), and the time data from the second host apparatus 3.

The data D3 in the server apparatus 4 include the user ID, the password, and management data of each user registered in the server apparatus 4. The management data includes, for example, individual information such as a name, a birth date, an address, a telephone number, and an age of a user.

When the server apparatus 4 receives the user ID, the password, the storage device ID, the accessory ID (or the update accessory ID), and the time data from the second host apparatus 3, the server apparatus 4 automatically performs login in the account based on the received user ID and password and registers the received storage device ID, accessory ID (or the update accessory ID), and time data in the data D3 in association with the corresponding user ID and password.

As a result, the server apparatus 4 (in other words, an administrator) can obtain history information indicating when and who used a certain accessory with a certain wireless storage device 1.

The data D4 in the server apparatus 4 include image data corresponding to the accessory ID and the update accessory ID.

For example, an image data of a character depicted on an accessory is stored in association with an accessory ID, and image data of an upgraded character is stored in the update accessory ID. For example, when an image of a character holding no weapon with its hand corresponds to the accessory ID, the image of the character having a sword (weapon) with its hand corresponds to the update accessory ID.

Figure 13:
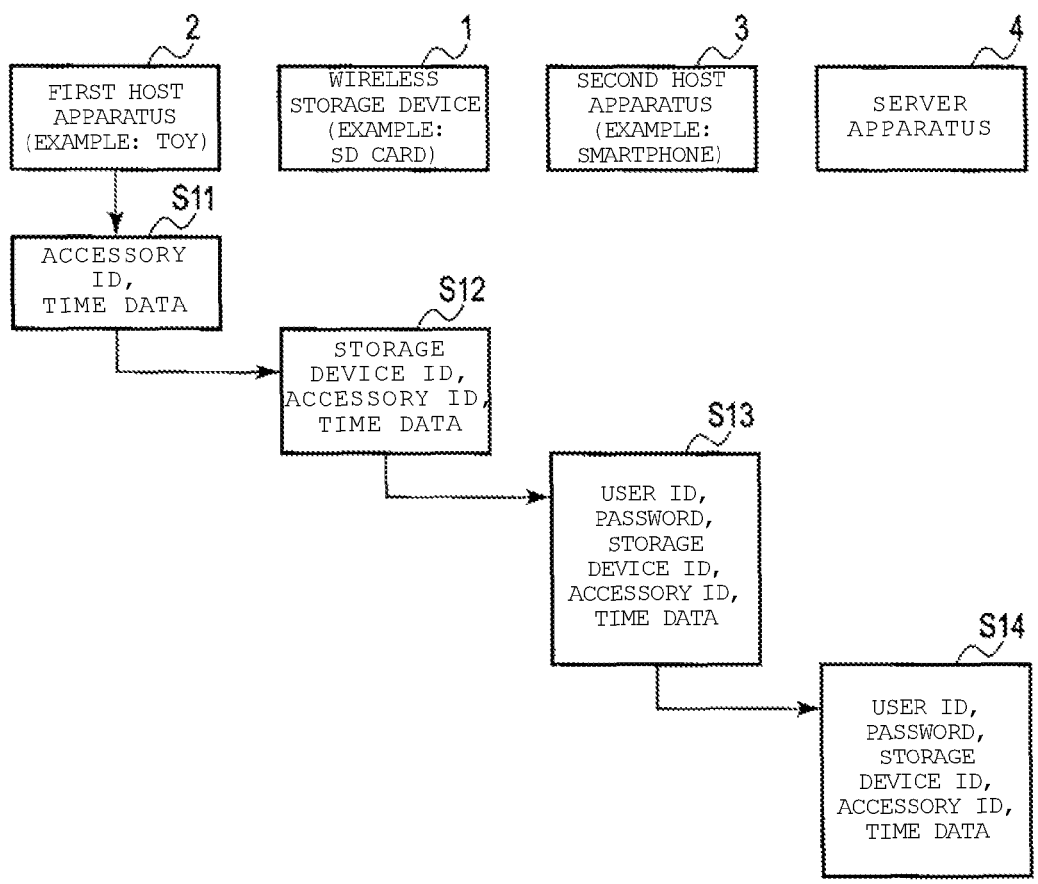
FIG. 13 is a flowchart illustrating a process of registering an accessory ID according to the first embodiment.

FIG. 13 is a flowchart illustrating a process of registering the accessory ID in the server apparatus 4 of the information processing system 100.

When the wireless storage device 1 is mounted on the slot of the first host apparatus 2, the first host apparatus 2 reads the accessory ID from the accessory A1 and acquires the time data indicating the time of reading the accessory ID (S11).

When the first host apparatus 2 reads the accessory ID and acquires the time data, the wireless storage device 1 stores the accessory ID and the time data in the nonvolatile memory 7 in association with each other, and subsequently perform the mirroring to the wireless communication memory 12 (S12).

In this state, when the second host apparatus 3 is held near the wireless storage device 1 by the user so that wireless communication can be performed, the second host apparatus 3 acquires the storage device ID, the accessory ID, and the time data from the wireless storage device 1 in association with each other, and the second host apparatus 3 transmits the storage device ID, the accessory ID, and the time data to the server apparatus 4 along with the user ID and the password (S13).

The server apparatus 4 automatically accesses an account of the user based on the user ID and the password and stores the accessory ID and the time data in association with the storage device ID (S14: see the data D3 of FIG. 11).

Figure 14:
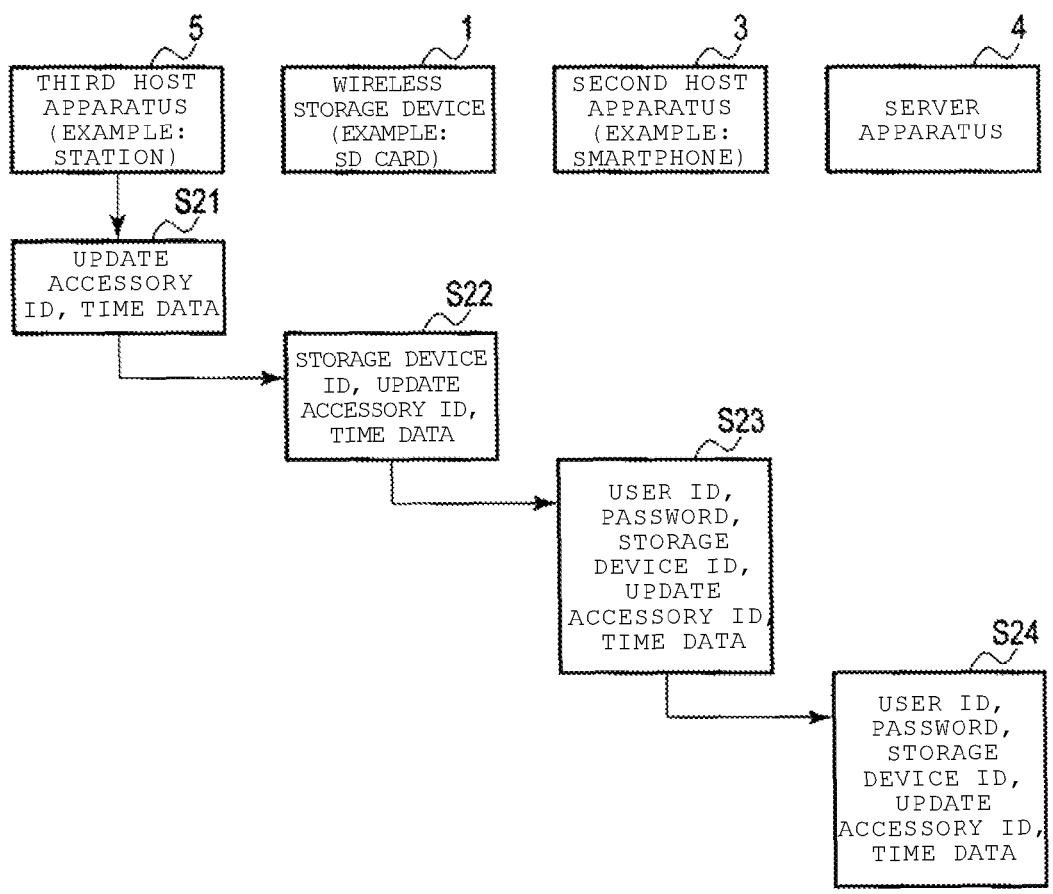
FIG. 14 is a flowchart illustrating a process of updating the accessory ID according to the first embodiment.

FIG. 14 is a flowchart illustrating a process of registering the update accessory ID (upgraded character) from the second host apparatus 3 to the server apparatus 4 of the information processing system 100.

The third host apparatus 5 transmits the update accessory ID and the time data to the wireless storage device 1 when the wireless storage device 1 is held near the third host apparatus 5 (or mounted on a physical interface thereof) in a predetermined event (S21). The physical interface is an interface of the third host apparatus 5 which can be physically connected to the wireless storage device 1. For example, when the wireless storage device 1 is an SD memory card, the physical interface is an SD memory card slot.

When the wireless storage device 1 receives the update accessory ID and the time data from the third host apparatus 5, the wireless storage device 1 stores the received accessory ID and the time data in the nonvolatile memory 7 in association with each other, and subsequently performs the mirroring to the wireless communication memory 12 (S22).

In this state, when the second host apparatus 3 is held near the wireless storage device 1 by the user so that wireless communication can be performed, the second host apparatus 3 acquires the storage device ID, the update accessory ID, and the time data from the wireless storage device 1 in association with each other, and the second host apparatus 3 transmits the storage device ID, the update accessory ID, and the time data to the server apparatus 4 along with the user ID and the password (S23).

The server apparatus 4 automatically accesses the account of the user based on the user ID and the password and stores the update accessory ID and the time data in association with the storage device ID (S24: see the data D3 of FIG. 11).

Figure 15:
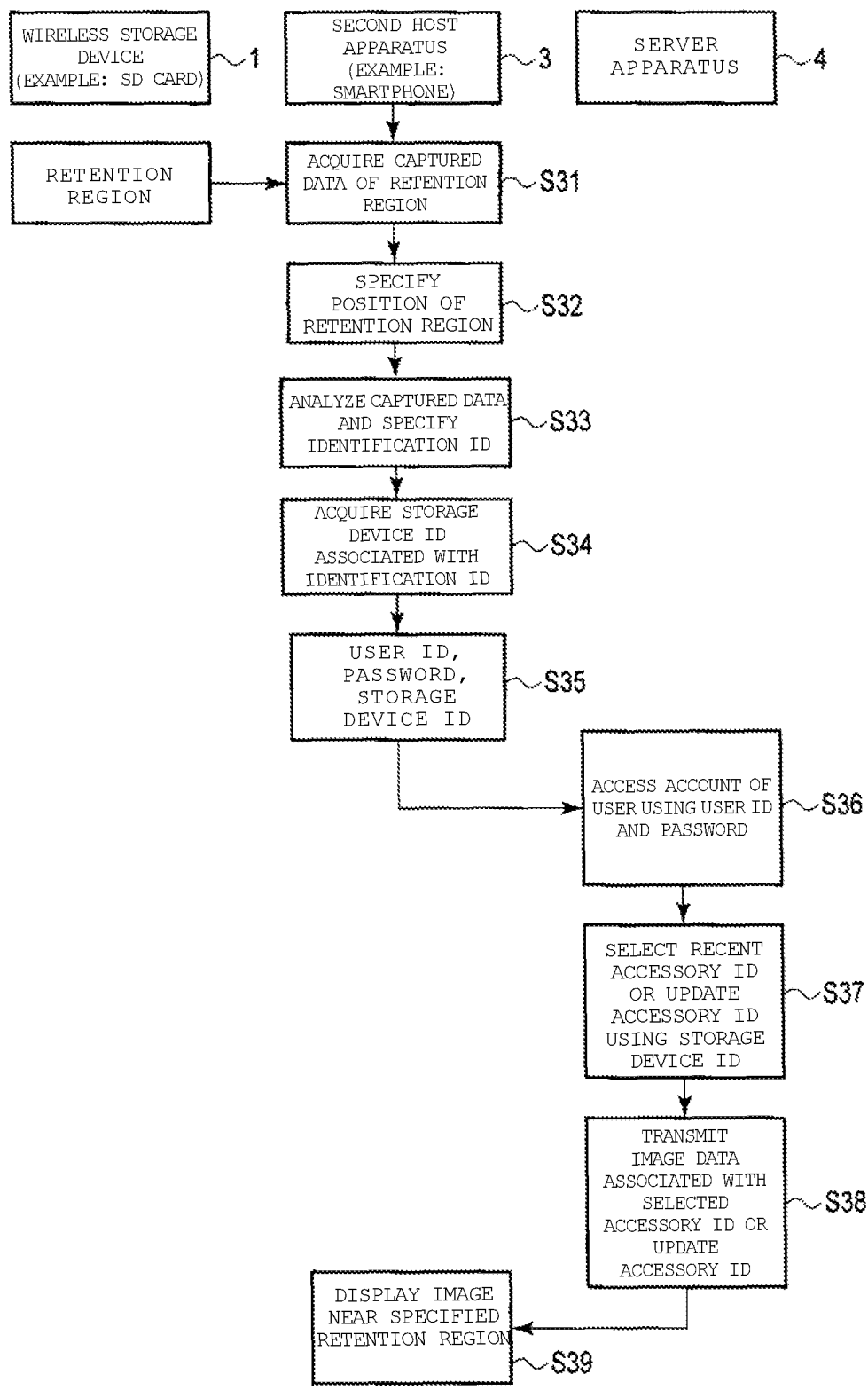
FIG. 15 is a flowchart illustrating an augmented reality (AR) process according to the first embodiment.

FIG. 15 is a flowchart illustrating an augmented reality (AR) process performed in accordance with the application stored in the AR application region 1096 of the second host apparatus 3.

The user operates the input unit 1100 of the second host apparatus 3 to cause the imaging unit 1110 to capture an image including the retention region 1a of the wireless storage device 1. As a result, the second host apparatus 3 acquires the captured data of the retention region 1a (S31). More specifically, the second host apparatus 3 acquires captured data including the QR code printed in the retention region 1a.

The second host apparatus 3 specifies the position the retention region 1a (the QR code) in the image of the captured data (S32).

The second host apparatus 3 analyzes the QR code included in the captured data and extracts the identification ID of the wireless storage device 1 (S33).

The second host apparatus 3 acquires the storage device ID associated with the acquired identification ID, from the storage device IDs stored in the storage unit 1090 (S34). For example, when the second host apparatus 3 performs the wireless communication with the wireless storage device 1 for the first time, the second host apparatus 3 acquires the storage device ID and the identification ID from the wireless storage device 1 in association with each other and stores the storage device ID and the identification ID in the storage unit 1090. In the present embodiment, the identification ID and the storage device ID are assumed to be different data, but may be the same data. When the identification ID and the storage device ID are the same data, the second host apparatus 3 may not perform the process of reading the storage device ID associated with the acquired identification ID.

When the second host apparatus 3 acquires the storage device ID, the second host apparatus 3 transmits the acquired storage device ID to the server apparatus 4 along with the user ID and the password (S35).

When the server apparatus 4 receives the storage device ID, the user ID, and the password from the second host apparatus 3, the server apparatus 4 accesses the account of the user using the user ID and the password (S36).

The server apparatus 4 searches for the accessory ID or the update accessory ID associated with the storage device ID with reference to the data D3 using the storage device ID, and selects the accessory ID or the update accessory ID associated with a newest time from the time data associated with the accessory ID and the update accessory ID (S37).

The server apparatus 4 acquires the image data associated with the selected accessory ID or the update accessory ID from the data D4 and transmits the acquired image data to the second host apparatus 3 (S38).

The second host apparatus 3 combines the received image data with the captured data and causes an image corresponding to the received image data to be displayed near the retention region 1a (S39).

Accordingly, the user can visually recognize the image of the character most recently stored in the wireless storage device 1 on the display unit 1095 of the second host apparatus 3.

FIGS. 16 to 27 schematically illustrate a process performed by the information processing system 100 according to the first embodiment. Operations of the information processing system 100 will be described with reference to FIGS. 16 to 27.

Figure 16:
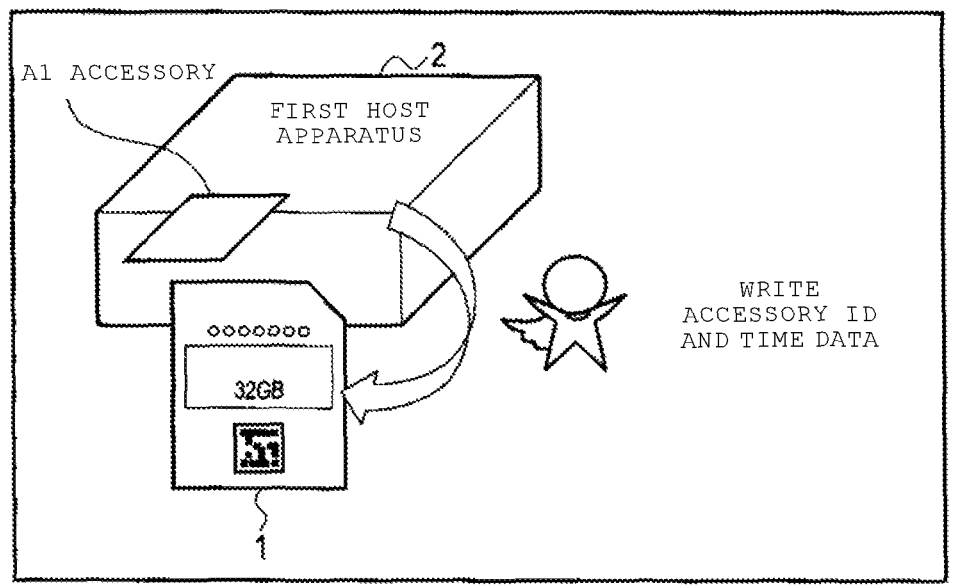
FIGS. 16-27 schematically illustrate an operation carried out in the information processing system according to the first embodiment.

When the user mounts the wireless storage device 1 on the slot of the first host apparatus 2 and mounts the accessory A1, the accessory ID (content) and the time data are written in the wireless storage device 1 (see FIG. 16).

Figure 17:
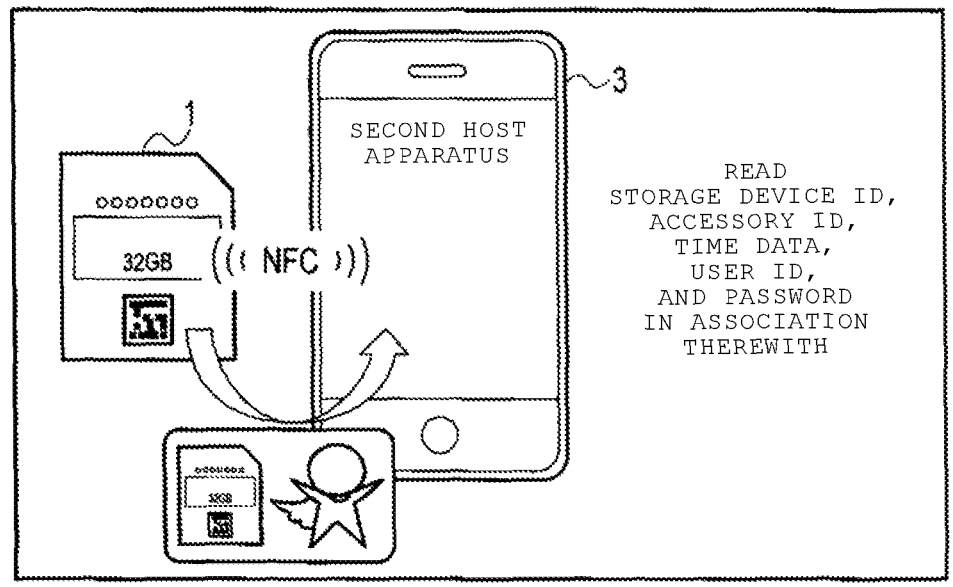
Figure 18:
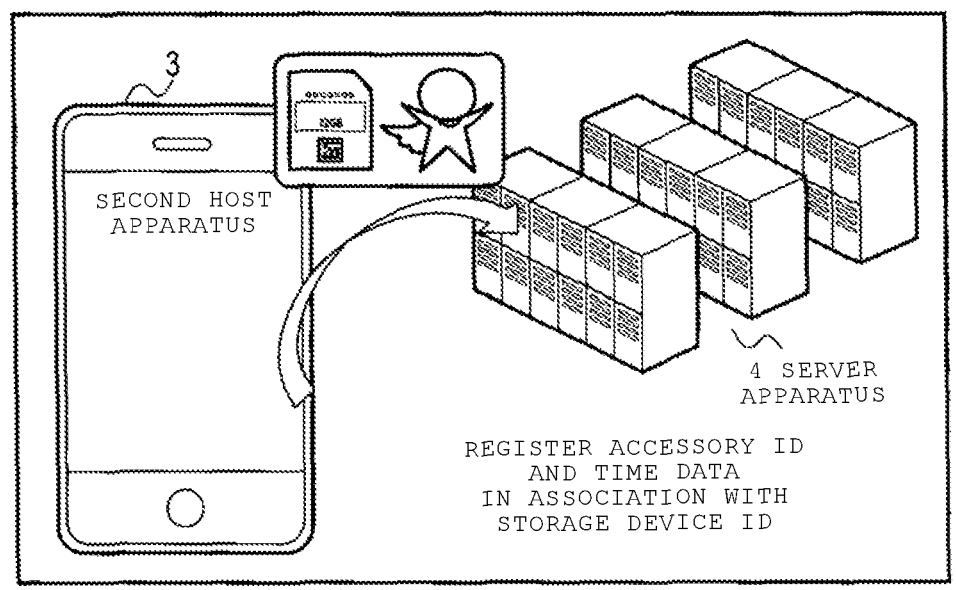

Thereafter, when the wireless storage device 1 and the second host apparatus 3 are located within a predetermined distance, the wireless communication (NFC) is performed between the wireless storage device 1 and the second host apparatus 3, and the second host apparatus 3 reads the accessory ID and the time data in association with the storage device ID (see FIG. 17).

The second host apparatus 3 transmits the user ID, the password, the storage device ID, the accessory ID, and the time data to the server apparatus 4. The server apparatus 4 accesses the account of the user using the user ID and the password, and registers the accessory ID and the time data in association with the storage device ID (see FIG. 18).

Figure 19:
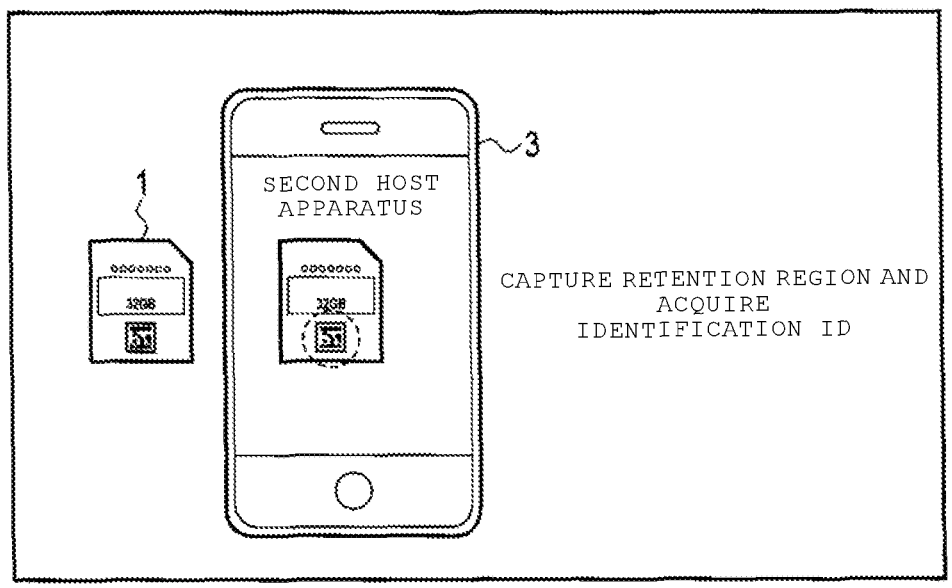
Figure 20:
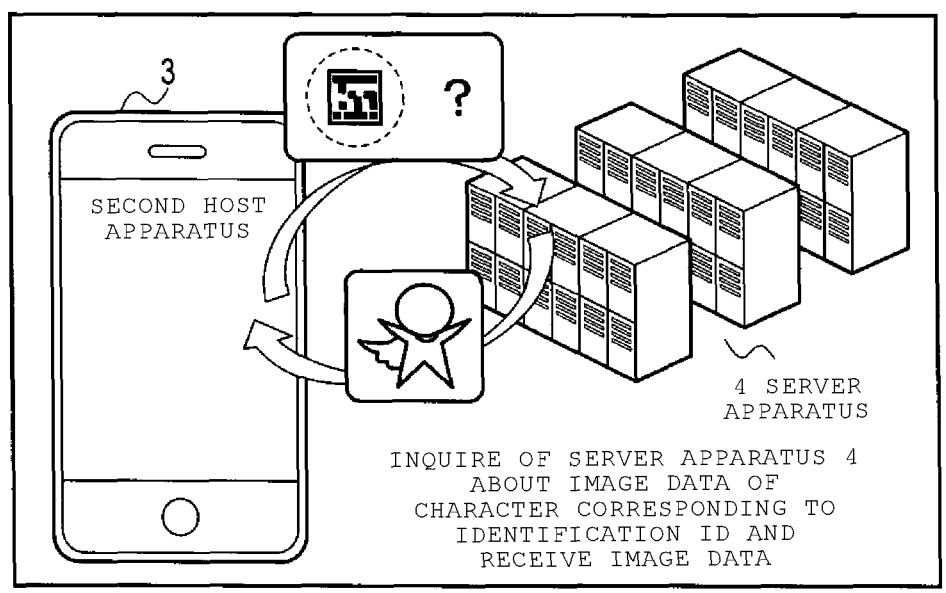

Next, when the user operates the second host apparatus 3 so as to capture an image including the retention region 1a of the wireless storage device 1, the captured data of the retention region 1a (the QR code) is analyzed and the identification ID is extracted from the analysis result of the QR code (see FIG. 19).

The second host apparatus 3 transmits the user ID, the password, and the storage device ID corresponding to the identification ID to the server apparatus 4. That is, the second host apparatus 3 inquires of the server apparatus 4 about the image data of the character stored in the wireless storage device 1 using the storage device ID corresponding to the identification ID and receives the image data (see FIG. 20).

Figure 21:
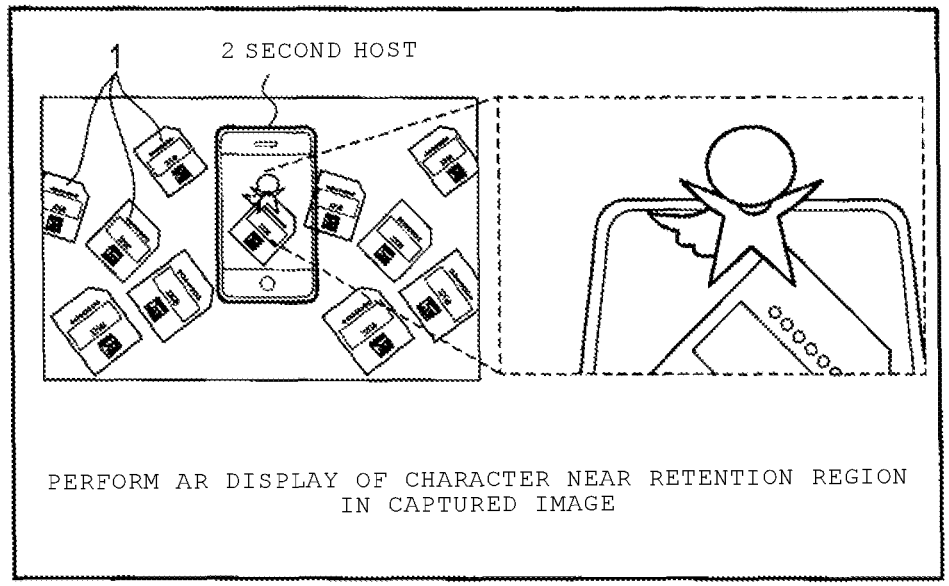

The second host apparatus 3 combines the image data received from the server apparatus 4 with the captured data near the retention region 1a and displays the combined data on the display unit 1095 (see FIG. 21). In this way, the AR display of the character stored in the wireless storage device 1 is performed, so that the user can immediately visually recognize a use purpose (for example, a game) of the wireless storage device 1.

When there is a plurality of wireless storage devices 1 and a target wireless storage device 1 of image capturing is changed, the processes described with reference to FIGS. 16 to 21 described above are performed again and the image of the character displayed on the display unit 1095 is also changed. Therefore, when the user carries the plurality of wireless storage devices 1, the user can immediately visually recognize a use purpose of each wireless storage device 1.

Further, the retention region 1a of one wireless storage device 1 is image-captured in the above description, but an exemplary embodiment is not limited thereto. The retention units 1a of two or more wireless storage devices 1 may be image-captured so that the retention units 1a are contained within the same imaging range. In this case, the AR process is performed on the retention region 1a of each wireless storage device 1 and a most recently registered character is displayed near the retention region 1a of each wireless storage device 1 displayed on the display unit 1095.

Next, for example, when a predetermined event (upgrade event) of a character is performed, the user can bring the wireless storage device 1 near a predetermined area (detection area) 5a of the third host apparatus 5 within a predetermined distance. That is, the wireless storage device 1 is held near the predetermined area 5a of the third host apparatus 5. The predetermined area 5a is an area in which the wireless communication (NFC) with the wireless storage device 1 can be performed. The wireless storage device 1 may be physically connected to the third host apparatus 5. In the present embodiment, the upgrade is assumed to be change of a state (corresponding to the accessory ID) in which the character has no weapon to a state (corresponding to the update accessory ID) in which the character has a sword (weapon).

Figure 22:
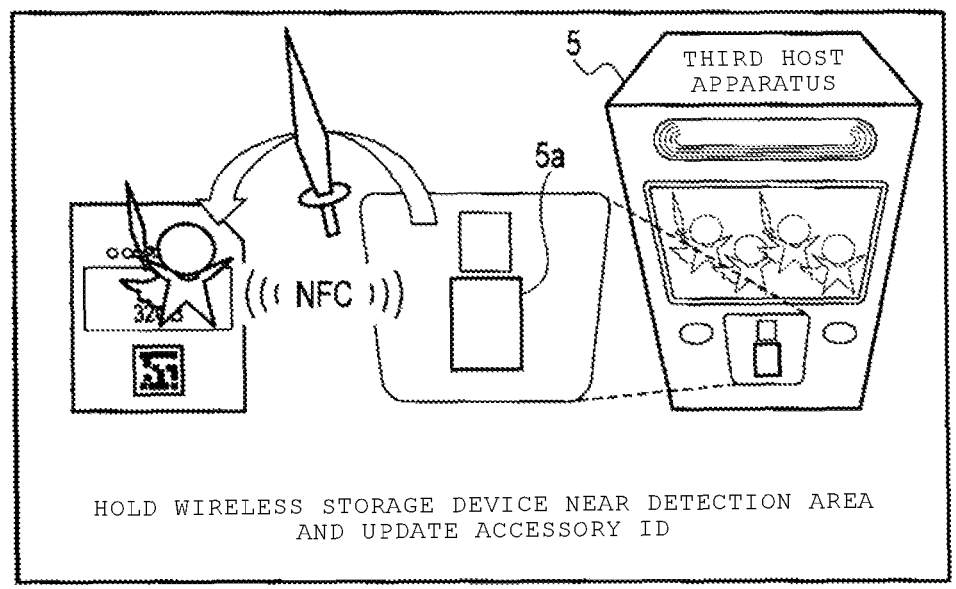
Figure 23:
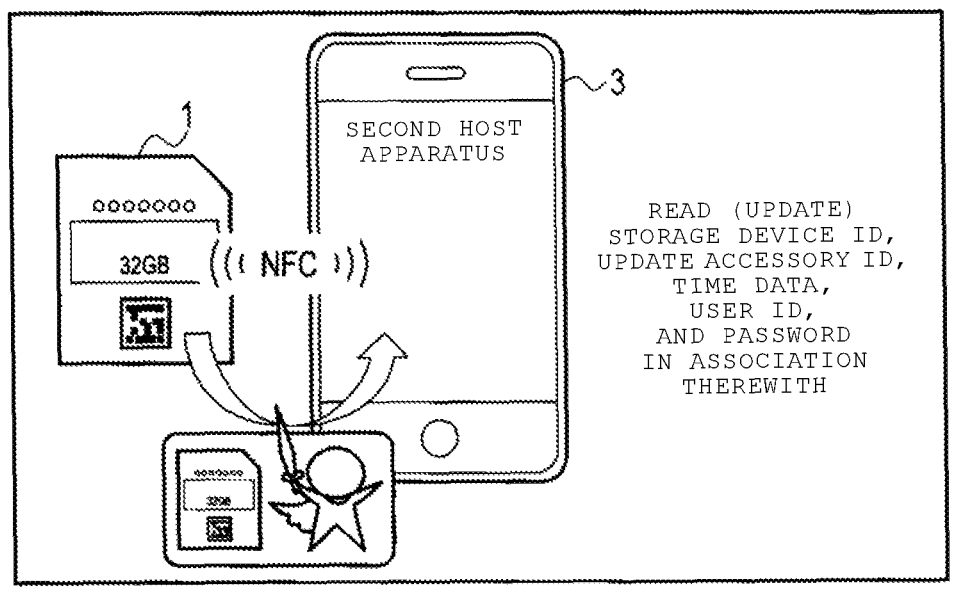
Figure 24:
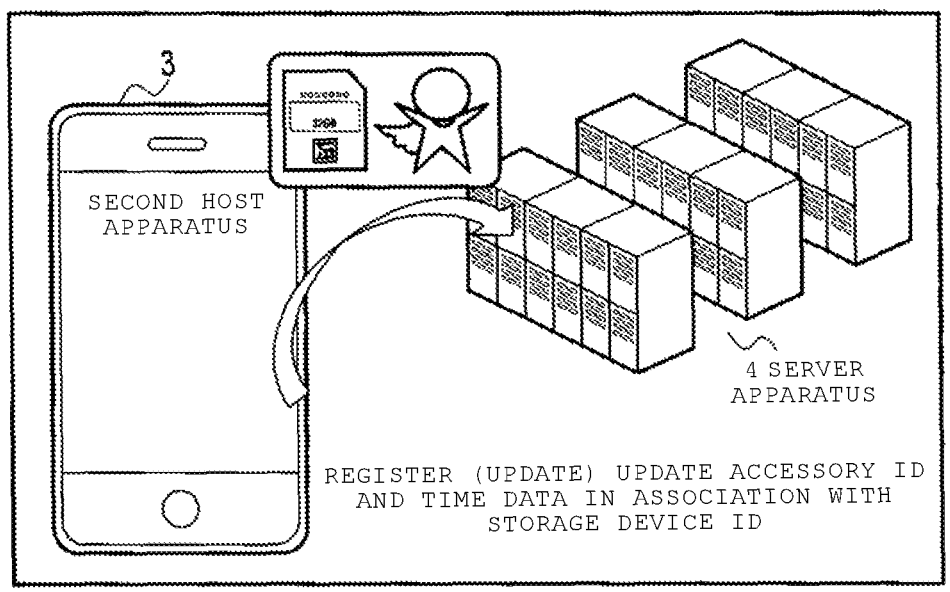

When the wireless storage device 1 and the third host apparatus 5 perform the wireless communication, the wireless storage device 1 receives the update accessory ID of the upgraded character and the time data and updates the accessory ID (see FIG. 22).

When the update accessory ID and the time data are written in the wireless storage device 1 in this way and subsequently the wireless storage device 1 and the second host apparatus 3 are located within the predetermined distance, the wireless communication (NFC) is performed between the wireless storage device 1 and the second host apparatus 3. At this time, the second host apparatus 3 reads (updates) the user ID, the password, the update accessory ID, the time data, and the storage device ID in association with each other (see FIG. 23).

The second host apparatus 3 transmits the user ID, the password, the storage device ID, the update accessory ID, and the time data to the server apparatus 4. The server apparatus 4 automatically accesses the account of the user using the user ID and the password, and the update accessory ID and the time data are registered (updated) in association with the storage device ID (see FIG. 24).

Figure 25:
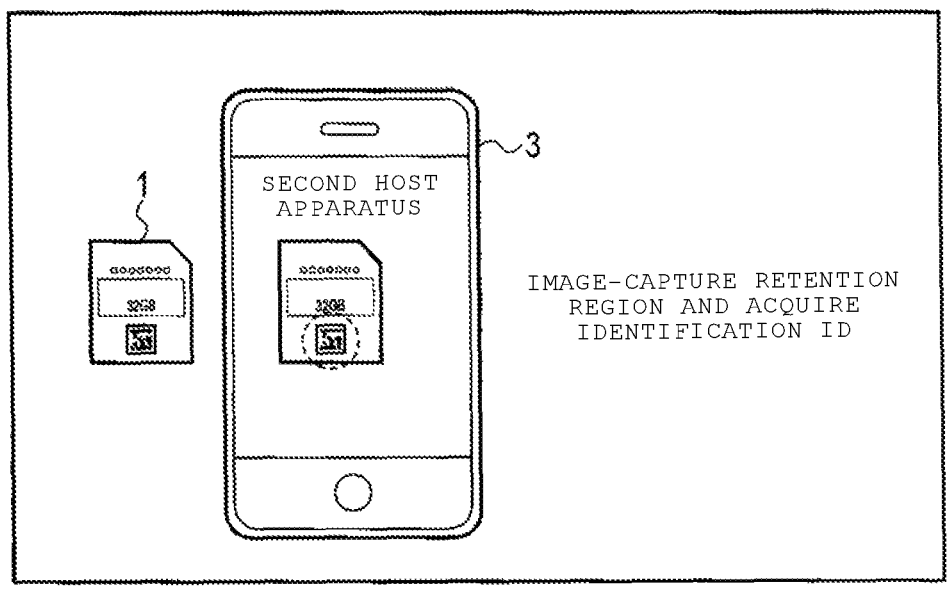
Figure 26:
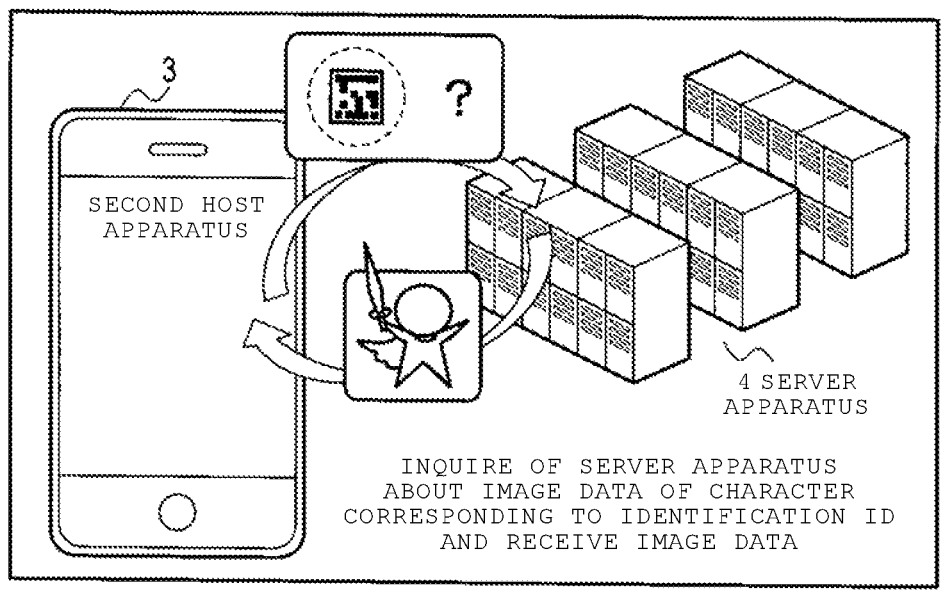

Next, when the user operates the second host apparatus 3 to capture an image including the retention region 1a of the wireless storage device 1, image data of the retention region 1a (the QR code) are analyzed and the identification ID is extracted from the analysis result of the QR code (see FIG. 25).

The second host apparatus 3 transmits the user ID, the password, and the storage device ID corresponding to the identification ID to the server apparatus 4. That is, the second host apparatus 3 inquires of the server apparatus 4 about the image data of the character stored in the wireless storage device 1 using the storage device ID corresponding to the identification ID and receives the image data (see FIG. 26).

Figure 27:
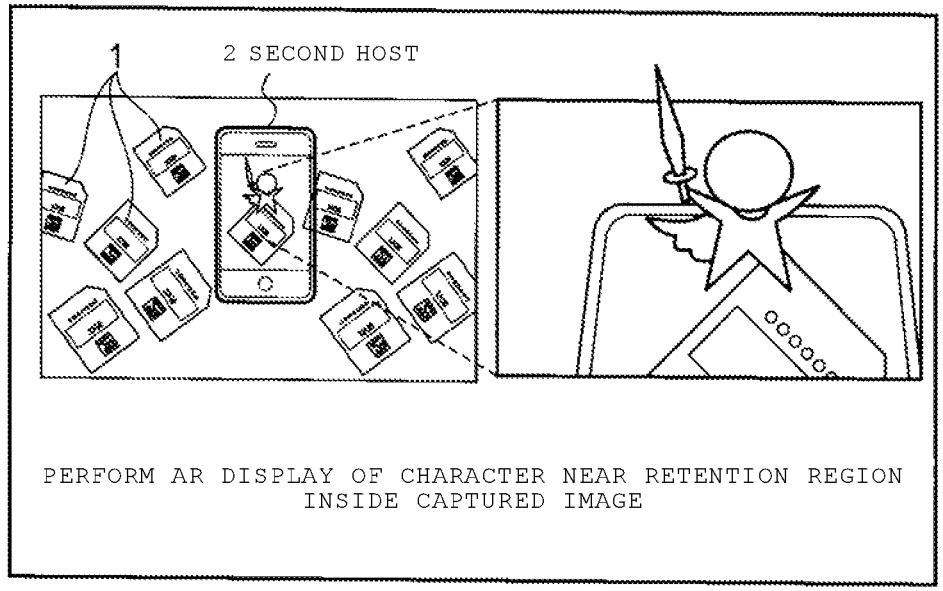

The second host apparatus 3 combines the image data received from the server apparatus 4 with the captured data, and causes an image corresponding to the image data to be displayed near the retention region 1a on the display unit 1095 (see FIG. 27). In this way, the AR display of the character stored in the wireless storage device 1 is performed, so that the user can immediately visually recognize that the displayed character has the sword. That is, the user can simply confirm that the character is successfully upgraded, using the second host apparatus 3.

According to the information processing system 100 having the foregoing configuration, by image-capturing the wireless storage device 1 using the second host apparatus 3, an character associated with data stored in the wireless storage device 1 is displayed on the display unit 1095 of the second host apparatus 3. As a result, the user can immediately visually recognize a use purpose of the wireless storage device 1. For example, when a character of a predetermined game is displayed, the user can visually recognize that the wireless storage device 1 is used as a storage device for the predetermined game.

In addition, when a character stored in the wireless storage device 1 is upgraded at a predetermined event, by holding the second host apparatus 3 near the wireless storage device 1 and image-capturing the retention region 1*a* of the wireless storage device 1 using the imaging unit 1110 of the second host apparatus 3, the user can view the image of an upgraded character, and thus can visually recognize that the character is successfully upgraded.

Second Embodiment

A difference between the first and second embodiments is the position of the information storage unit 4*a*. Specifically, in the first embodiment, the information storage unit 4*a* is provided in the server apparatus 4. In the second embodiment, however, the information storage unit 4*a* is provided in the second host apparatus 3, and the server apparatus 4 is not included in an information processing system 101 of the second embodiment.

The same reference numerals are used for elements same as those of the first embodiment and the detailed description will not be repeated.

FIG. 28 schematically illustrates an information processing system 101 including the wireless storage device 1 according to the present embodiment.

The information processing system 101 includes the wireless storage device 1, the first host apparatus 2, the second host apparatus 3, and the third host apparatus 5. The information processing system 101 is, for example, a toy system.

The second host apparatus 3 includes the information storage unit 4*a*. The information storage unit 4*a* stores the data D3 (see FIG. 11) and the data D4 (see FIG. 12).

FIG. 29 is a flowchart illustrating a process of registering an accessory ID according to the second embodiment.

The processes (S41 to S43) of storing the accessory ID and the time data in the second host apparatus 3 via the wireless storage device 1 are the same as those of the first embodiment (see FIG. 13). In the second embodiment, however, image data are stored in the information storage unit 4*a* of the second host apparatus 3 along with the accessory ID and the time data. Here, the image data are image data of a character corresponding to the accessory ID.

Unlike the first embodiment, the server apparatus 4 is not included in the information processing system 101. For that reason, in the second embodiment, the process (S14) of transmitting the accessory ID and the like from the second host apparatus 3 to the server apparatus 4 is not performed (see FIG. 13).

Figure 30:
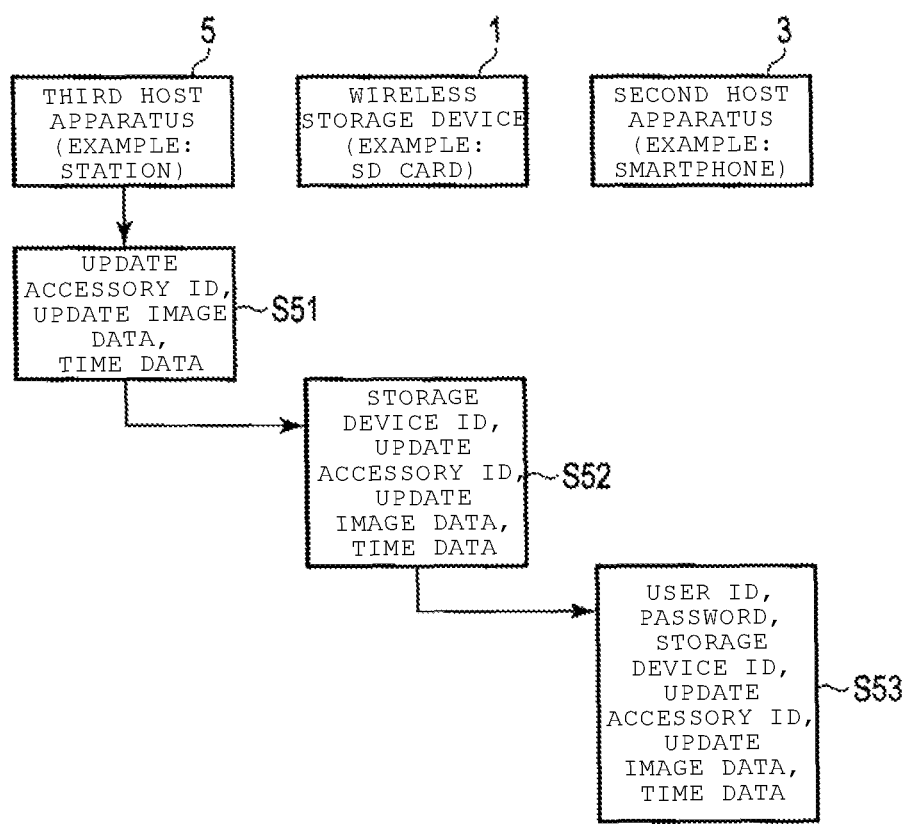
FIG. 30 is a flowchart illustrating a process of updating the accessory ID according to the second embodiment.

FIG. 30 is a flowchart illustrating a process of updating the accessory ID according to the second embodiment.

The processes (S51 to S53) of storing the update accessory ID and the time data in the second host apparatus 3 via the wireless storage device 1 are the same as those of the first embodiment (see FIG. 14). However, in the second embodiment, update image data are stored in the information storage unit 4*a* of the second host apparatus 3 along with the update accessory ID and the time data. Here, the update image data are image data of a character corresponding to an update accessory ID.

Unlike the first embodiment, the server apparatus 4 is not included in the information processing system 101. For that reason, in the second embodiment, the process (S24) of transmitting the update accessory ID and the like from the second host apparatus 3 to the server apparatus 4 is not performed similarly to the process of registering the accessory ID (see FIG. 29).

Figure 31:
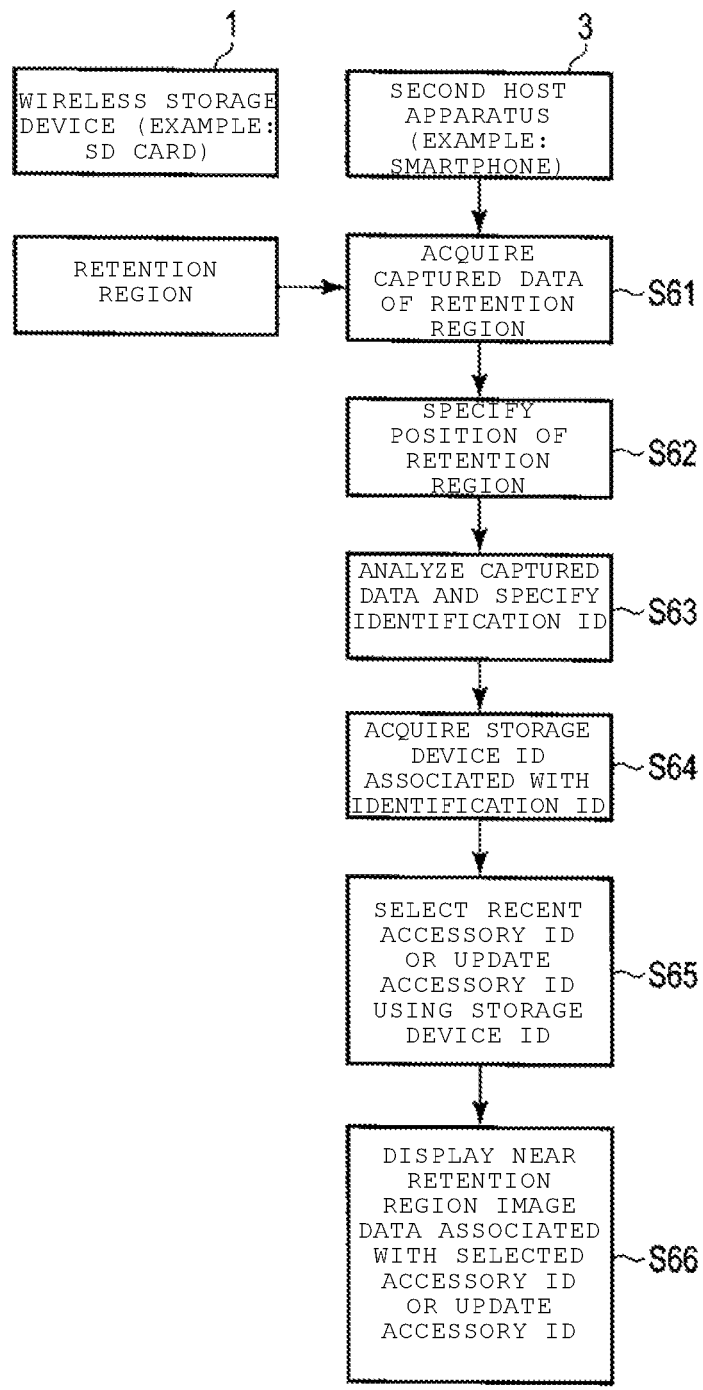
FIG. 31 is a flowchart illustrating an augmented reality (AR) process according to the second embodiment.

FIG. 31 is a flowchart illustrating an augmented reality (AR) process according to the second embodiment.

A difference between the first embodiment (see FIG. 15) and the second embodiment (S61 to S66) is that the storage device ID and the like corresponding to the identification ID are not transmitted from the second host apparatus 3 to the server apparatus 4 in the information processing system 100 according to the second embodiment, and the image data or the update image data associated with the accessory ID or the update accessory ID selected by the server apparatus 4 is not received by the second host apparatus 3 from the server apparatus 4 according to the second embodiment.

Figure 32:
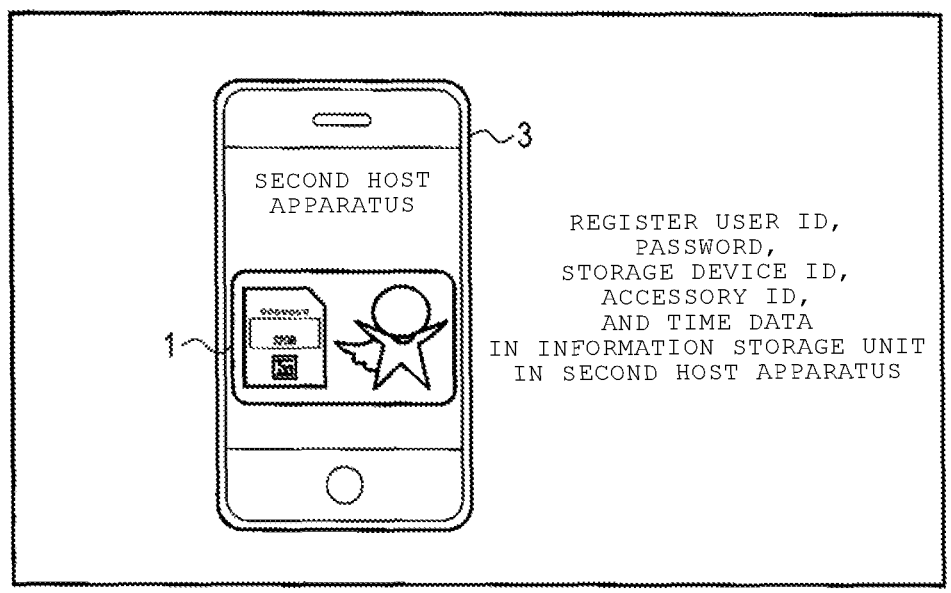
FIGS. 32-34 schematically illustrate an operation carried out in the information processing system according to the second embodiment.
Figure 33:
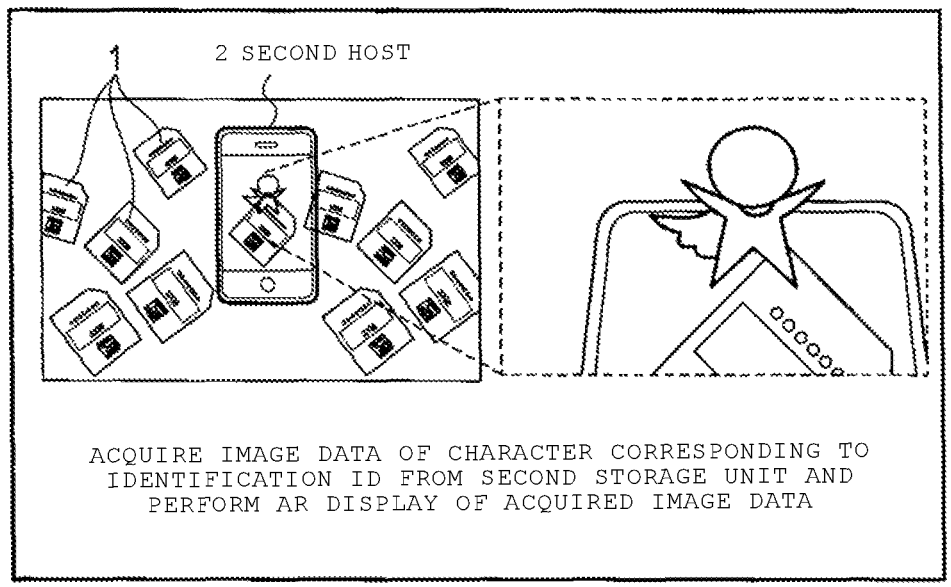
Figure 34:
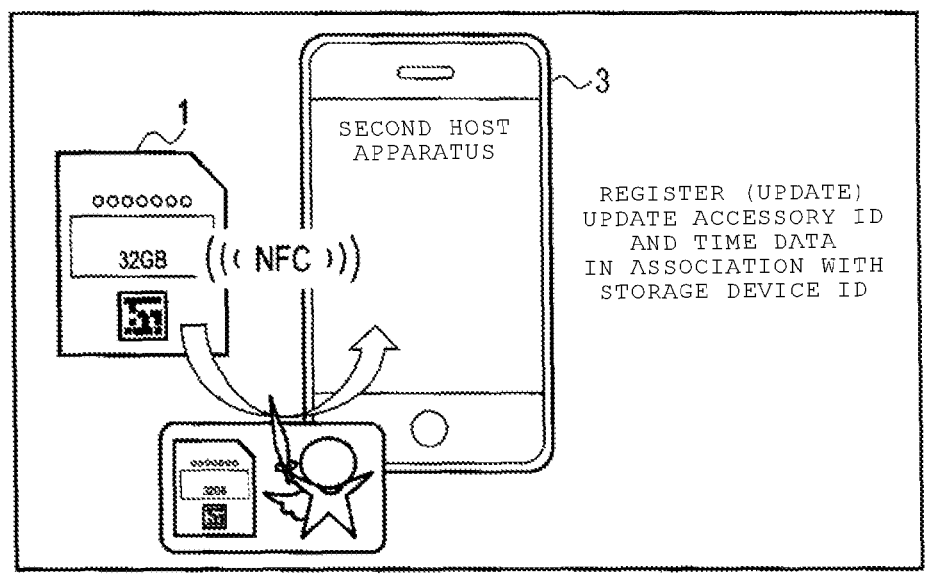

FIGS. 32 to 34 schematically illustrate a process according to the second embodiment. Operations of the information processing system 101 will be described with reference to FIGS. 32 to 34. For the same processes as those of the first embodiment, the above-described drawings are appropriately referred to.

The accessory ID (the ID of the character) and the time data are written in the wireless storage device 1 (see FIG. 16), and the second host apparatus 3 reads the accessory ID, the time data, and the storage device ID with each other in association with each other (see FIG. 17), as in the first embodiment.

The second host apparatus 3 associates the user ID, the password, the storage device ID, the accessory ID, and the time data with the storage device ID and registers the accessory ID and the time data in association with the storage device ID in the information storage unit 4*a* (see FIG. 32).

Next, the user operates the second host apparatus 3 to analyze the captured data of the retention region 1*a* of the wireless storage device 1 and obtain the identification ID from the analysis result (see FIG. 19), as in the first embodiment.

The second host apparatus 3 acquires the accessory ID corresponding to the storage device ID from the information storage unit 4*a* based on the storage device ID corresponding to the identification ID, acquires the image data associated with the accessory ID, combines the acquired image data with the captured data and causes an image corresponding to the image data is displayed near the retention region 1*a* on the display unit 1095 (see FIG. 33).

Next, the wireless storage device 1 and the third host apparatus 5 perform wireless communication, so that the wireless storage device 1 receives the update accessory ID and the time data of the upgraded character from the third host apparatus 5 and updates the accessory ID (see FIG. 22), and the second host apparatus 3 reads the update accessory ID, the time data, and the storage device ID in association with each other (see FIG. 23), as in the first embodiment.

The second host apparatus 3 registers (updates) the update accessory ID and the time data in the information storage unit 4*a* in association with the storage device ID using the user ID, the password, and the storage device ID (see FIG. 34).

Next, when the user operates the second host apparatus 3 so as to capture an image including the retention region 1a of the wireless storage device 1, the captured data of the retention region 1a (the QR code) is analyzed and the identification ID is extracted from the analysis result of the QR code (see FIG. 25). Thereafter, the update image data acquired from the information storage unit 4a is combined with the captured data based on the storage device ID corresponding to the identification ID, and an image corresponding to the image data is displayed near the retention region 1a on the display unit 1095 (see FIG. 26), as in the first embodiment.

According to the information processing system 101 according to the second embodiment, it is possible to obtain the same advantages as those of the information processing system 100 according to the first embodiment.

Further, according to the information processing system 101 of the second embodiment, the information storage unit 4a is provided in the second host apparatus 3. For that reason, even when communication with the server apparatus 4 is not performed, the image data of the accessory ID or the update image data of the update accessory ID can be acquired.

That is, when the AR function of the second host apparatus 3 is realized, even if communication with the server apparatus 4 cannot be performed due to a communication failure, the character or the upgraded character stored in the wireless storage device 1 can be displayed by image-capturing the wireless storage device 1 using the second host apparatus 3. As a result, the user can immediately visually recognize a use purpose of the wireless storage device 1.

When the accessory ID (or an update accessory) is registered in the information storage unit 4a, the user ID and the password are used in the above embodiment. However, an exemplary embodiment is not limited thereto. Since it is not necessary to access an account of the user provided in the server apparatus 4, the data D3 and the data D4 may be managed using the storage device ID without using the user ID and the password.

Third Embodiment

A difference between the first and third embodiments is a process of registering (updating) the update accessory ID in the information storage unit 4a. Specifically, in the first embodiment, the process of registering (updating) the update accessory ID in the server apparatus 4 is performed. In the third embodiment, however, processes of transmitting the update accessory ID from the third host apparatus 5 to the server apparatus 4 is performed concurrently with transmission of the update accessory ID from the third host apparatus 5 to the wireless storage device 1 and registration (update) of the update accessory ID in the server apparatus 4.

The same reference numerals are used for elements same as those of the first embodiment and the detailed description will not be repeated.

Figure 35:
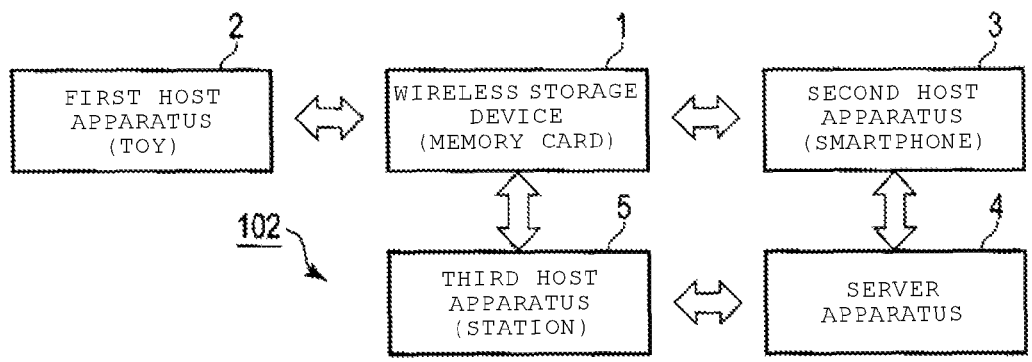
FIG. 35 schematically illustrates a configuration of an information processing system according to a third embodiment.

FIG. 35 schematically illustrates an information processing system 102 including the wireless storage device 1 according to the present embodiment.

The information processing system 102 includes the wireless storage device 1, the first host apparatus 2, the second host apparatus 3, and the third host apparatus 5. The information processing system 102 is, for example, a toy system.

Figure 36:
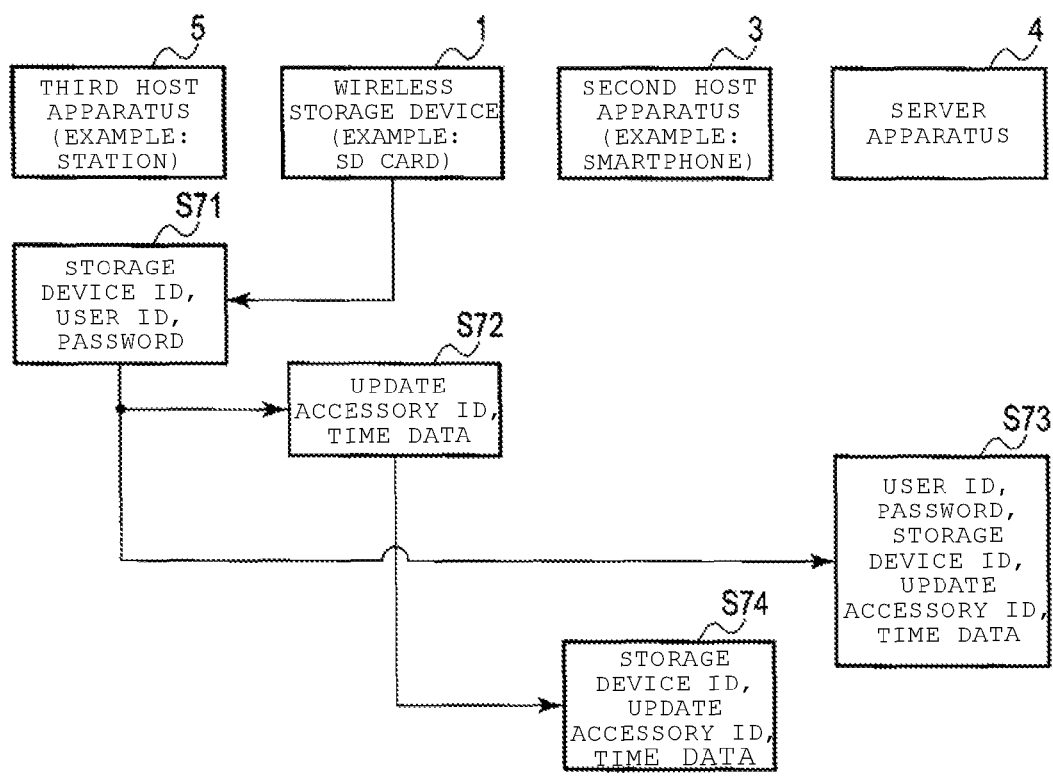
FIG. 36 is a flowchart illustrating a process of updating the accessory ID according to the third embodiment.

FIG. 36 is a flowchart illustrating a process of updating an accessory ID according to the third embodiment.

When the user mounts the wireless storage device 1 on the slot of the first host apparatus 2 and mounts the accessory A1 on the first host apparatus 2, the first host apparatus 2 acquires the storage device ID of the wireless storage device 1 and the user ID and the password used to access an account of the user in the server apparatus 4 (S71).

When the storage device ID, the user ID, and the password are acquired in this way, the update accessory ID and the time data are transmitted from the third host apparatus 5 to the wireless storage device 1 (S72). That is, the update accessory ID and the time data are written in the wireless storage device 1.

Along with this process, the storage device ID, the user ID, the password, the update accessory ID, and the time data acquired from the wireless storage device 1 are transmitted to the server apparatus 4. The third host apparatus 5 can automatically access the account of the user in the server apparatus 4 using the user ID and the password. The server apparatus 4 registers (updates) the update accessory ID and the time data received from the third host apparatus 5 in association with the storage device ID in the information storage unit 4a (S73).

When the wireless storage device 1 and the second host apparatus 3 can perform wireless communication, the storage device ID, the update accessory ID, and the time data are written in the second host apparatus 3, as in the first embodiment (S74).

In the information processing system 102 according to the third embodiment, the data D3 in the information storage unit 4a of the server apparatus 4 can be updated substantially simultaneously when the update accessory ID is written in the wireless storage device 1. Therefore, by image-capturing the retention region 1a of the wireless storage device 1 with the second host apparatus 3 after the upgrading of the character of the wireless storage device 1, the user can confirm an image of an upgraded character even when the wireless communication between the wireless storage device 1 and the second host apparatus 3 is not completed.

In the foregoing embodiments, one first host apparatus 2 is included in the information processing systems 100, 101, and 102. However, different kinds of first host apparatuses 2 may be used. In this case, data associated with information (for example, a terminal device ID) for identifying each first host apparatus 2, the accessory ID, and the time data may be acquired by the wireless storage device 1, and data may be managed for identification information of each first host apparatus 2, in the second host apparatus 3, the third host apparatus 5, and the server apparatus 4.

In the foregoing embodiments, the newest character or updated character registered in the wireless storage device 1 is displayed, but an exemplary embodiment is not limited thereto. For example, the number of characters to be displayed may be arbitrarily set through setting of application data in the AR application region 1096.

That is, the AR application region 1096 may also store pre-uploaded image data corresponding to a predetermined number of accessory IDs that were registered prior to the most recently registered or updated accessory ID based on the setting of the number of characters to be displayed and history information. The display unit 1095 may simultaneously display the image data corresponding to the predetermined number of accessory IDs and the update image data.

For example, a display number setting region that to set a number of characters to be displayed may be provided in the AR application region 1096. The user may operate the input unit 1100 to change setting of the display number setting region.

Specifically, when the user sets the AR application region 1096 so that five most recently registered or updated characters are displayed (for example, sets the display number setting unit from 1 to 5), the AR application region 1096 can acquire the image data and the update image data corresponding to five latest accessory IDs or update accessory IDs based on the storage device ID and the time data corresponding to the identification ID acquired by reading data from the information storage unit 4a and can display the acquired image data or update image data on the display unit 1095.

As a result, the user can visually recognize the plurality of recently registered or updated characters at a time.

When the user sets the AR application region 1096 so that a plurality of characters is displayed on the display unit 1095, the application in the AR application region 1096 may cause the number of updates of each accessory to be acquired from the information storage unit 4a based on the history information and the size of the character (content) displayed on the display unit 1095 to be changed according to the acquired number of updates.

Specifically, for example, each time the number of updates increases by 1, the size of the character may be enlarged by 10%.

As a result, the user can confirm the character of which number of update times is large among the displayed characters at first sight.

When the history information stored in the information storage unit 4a includes status information indicating a status set in the accessory ID (character) and the user sets the AR application region 1096 so that a plurality of characters are displayed on the display unit 1095, the application in the AR application region 1096 may cause the status information of each content to be acquired based on the history information and the size of the character (content) displayed on the display unit 1095 to be changed according to the acquired status. Here, the status is, for example, a level, strength, defense, or the like set in the character, but an exemplary embodiment is not limited thereto.

Specifically, for example, each time the level of the status increases by 1, the size of the character may be enlarged by 10%.

As a result, the user can confirm a difference in the status among the displayed characters by the size of the character at first sight.

Further, when the user sets the AR application region 1096 so that a plurality of characters is displayed on the display unit 1095, the application in the AR application region 1096 may cause the predetermined number of pieces of content to be displayed one by one on the display unit 1095 according to an input to the input unit 1100 by the user.

Specifically, for example, each time the user performs an input to the input unit 1100, the AR application region 1096 may cause the characters to be displayed one by one in order from the temporally newly registered or updated character on the display unit 1095.

As a result, the user can confirm the registered or updated characters in order.

Instead of displaying the characters one by one, a plurality (for example, three) of characters may be displayed at a time on the display unit 1095. When a plurality of characters is displayed at a time in this way, it is particularly effective to set the display number setting unit so that many characters can be all displayed when many characters are stored in the information storage unit 4a.

Further, in the foregoing embodiments, the accessory ID and the image data, and the update accessory ID and the update image data are different from each other, but an exemplary embodiment is not limited thereto. For example, the image data may be included in the accessory ID and the update image data may be included in the update accessory ID.

In the foregoing embodiments, the third host apparatus 5 performs the upgrading (the predetermined event) of the character stored in the wireless storage device 1, but an exemplary embodiment is not limited thereto.

For example, when information regarding an update accessory ID is included in an accessory for upgrade of a character and the accessory is mounted on the first host apparatus 2, the character may be upgraded by transmitting the update accessory ID from the first host apparatus 2 to the wireless storage device 1.

Further, the second host apparatus 3 may access a predetermined account of the server apparatus 4, a character may be upgraded on the account, and the character stored in the wireless storage device 1 may be upgraded by the second host apparatus 3.

Furthermore, in the foregoing embodiments, the second host apparatus 3 accesses the account of the user in the server apparatus 4 using the user ID and the password, but an exemplary embodiment is not limited thereto. For example, when the account in the server apparatus 4 is shared by all users, user IDs and passwords are not necessary. For that reason, when the second host apparatus 3 accesses the server apparatus 4, the user ID and the password may not be transmitted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. In a system where data generated in connection with an accessory ID may be stored in one of a plurality of portable memory devices including a first portable memory device, a method of dynamically associating the accessory ID with the first portable memory device and displaying confirmation of the association, comprising:

when an accessory having the accessory ID and the first portable memory device are coupled with a host apparatus, detecting the accessory ID and storing the accessory ID in the first portable memory device;

wirelessly transmitting the accessory ID and a device ID of the first portable memory device to a user computing device for registration of the accessory ID and the device ID of the first portable memory device in association with one another; and subsequent to the registration, upon determining that a code that is captured from a portable memory device uniquely corresponds to that of the first portable memory device, retrieving an image corresponding to the accessory ID that is registered in association with the device ID of the first portable memory device, and displaying the image on a display device for visual confirmation that the portable memory device contains the data generated in connection with the accessory ID.

2. The method according to claim 1, wherein
the image corresponding to the accessory ID that is retrieved and displayed on the display device is the image corresponding to the accessory ID at the time of the registration.

3. The method according to claim 1, further comprising:
subsequent to the registration, updating the image corresponding to the accessory ID, wherein
the image corresponding to the accessory ID that is retrieved and displayed is the updated image.

4. The method according to claim 1, wherein the user computing device is a mobile computing device and the wireless transmitting is triggered as a result of the mobile computing device being positioned within a near field communication (NFC) range of the first portable memory device.

5. The method according to claim 1, wherein
the device ID of the first portable memory device is registered in association with a plurality of accessory IDs, each of which has a corresponding image, and
upon determining that a code that is captured from a portable memory device uniquely corresponds to that of the first portable memory device, corresponding images of all of the accessory IDs that are registered in association with the device ID of the first portable memory device are retrieved and displayed on the display device.

6. The method according to claim 5, wherein
the corresponding images are displayed one by one.

7. The method according to claim 5, wherein
the corresponding images are displayed collectively.

8. The method according to claim 1, wherein
the registration is carried out using a storage unit of the user computing device.

9. The method according to claim 1, wherein
the registration is carried out using a storage unit of a server apparatus wirelessly communicating with the user computing device.

10. The method according to claim 1, wherein the display device is a display of the user computing device.

11. The method according to claim 1, wherein the display device is a display of a kiosk.

12. The method according to claim 1, wherein the code that is captured from the portable memory device is printed on an outer surface of the portable memory device.

13. A system in which data generated in connection with an accessory ID may be stored in one of a plurality of portable memory devices, the system comprising:

a host apparatus including a first mounting location for an accessory and a second mounting location for a portable memory device;
a user computing device to which an accessory ID of the accessory and a device ID of the portable memory device are wirelessly transmitted for registration of the accessory ID and the device ID in association with one another, the user computing device including a code reader that captures a code of the portable memory device; and
a display device on which an image corresponding to the accessory ID is displayed when the code is captured, the image displayed on the display device allowing for visual confirmation that the portable memory device contains data generated in connection with the accessory ID.

14. The system according to claim 13, wherein
the user computing device retrieves the image corresponding to the accessory ID that is registered in association with the device ID of the portable memory device.

15. The system according to claim 14, wherein
the user computing device is a mobile computing device that includes the display device.

16. The system according to claim 14, wherein
the user computing device is a kiosk that includes the display device.

17. The system according to claim 14, wherein
the image corresponding to the accessory ID that is retrieved and displayed on the display device is the image corresponding to the accessory ID at the time of the registration of the accessory ID in association with the device ID.

18. The system according to claim 14, wherein
the image corresponding to the accessory ID that is retrieved and displayed on the display device is an image that is updated or otherwise different from the image corresponding to the accessory ID at the time of the registration of the accessory ID in association with the device ID.

19. The system according to claim 13, wherein the user computing device is a mobile computing device and the wireless transmission of the accessory ID and the device ID to the mobile computing device is triggered as a result of the mobile computing device being positioned within a near field communication (NFC) range of the portable memory device.

* * * * *